US012656097B2

(12) United States Patent
Minatozaki

(10) Patent No.: US 12,656,097 B2
(45) Date of Patent: Jun. 16, 2026

(54) OUTPUT SIGNAL PROCESSING DEVICE FOR EDDY-CURRENT SENSOR

(71) Applicant: EBARA CORPORATION, Tokyo (JP)

(72) Inventor: Katsuya Minatozaki, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 229 days.

(21) Appl. No.: 18/376,168

(22) Filed: Oct. 3, 2023

(65) Prior Publication Data

US 2024/0118070 A1 Apr. 11, 2024

(30) Foreign Application Priority Data

Oct. 7, 2022 (JP) ................................. 2022-162333

(51) Int. Cl.
 *G01B 7/06* (2006.01)
 *B24B 37/013* (2012.01)

(52) U.S. Cl.
 CPC ............ *G01B 7/105* (2013.01); *B24B 37/013* (2013.01)

(58) Field of Classification Search
 CPC ..... B24B 37/013; B24B 49/105; G01B 7/105; G01B 1/00; G01B 3/00; G01B 5/00; G01B 7/00; G01B 9/00; G01B 11/00; G01B 13/00; G01B 15/00; G01B 17/00; G01B 21/00; G01B 2210/00; G01B 2290/00
 See application file for complete search history.

(56) References Cited

U.S. PATENT DOCUMENTS

| | | | |
|---|---|---|---|
| 2007/0103150 A1 | 5/2007 | Tada et al. | |
| 2010/0099334 A1* | 4/2010 | Bennett | ................. B24B 49/105 |
| | | | 451/8 |
| 2022/0063056 A1 | 3/2022 | Abe et al. | |

FOREIGN PATENT DOCUMENTS

| | | | | |
|---|---|---|---|---|
| CN | 110026883 A | * | 7/2019 | ............. B24B 7/005 |
| JP | 2005/121616 | | 5/2005 | |

* cited by examiner

*Primary Examiner* — Judy Nguyen
*Assistant Examiner* — Brent J Andrews
(74) *Attorney, Agent, or Firm* — BakerHostetler

(57) ABSTRACT

A retainer holds reference data for identifying a first AC generated signal corresponding to an output signal output in a reference state from a detection coil. When a film thickness of a conductor is to be measured, an AC signal generator generates the first AC generated signal based on the reference data and outputs it as a reference signal. When a film thickness of a conductor is to be measured, a difference circuitry receives input of an output signal and a reference signal output from the AC signal generator and acquires and outputs a film thickness amplitude that is a difference between the amplitude of the film thickness signal and the amplitude of the reference signal. The data generator in the reference state measures an amplitude of the output signal and generates the reference data.

10 Claims, 18 Drawing Sheets

OUTPUT SIGNAL PROCESSING DEVICE FOR EDDY-CURRENT SENSOR

CROSS REFERENCE TO RELATED APPLICATION

This application claims priority to Japanese Patent Application No. 2022-162333 filed Oct. 7, 2022, the entire contents of which are hereby incorporated by reference.

FIELD OF THE INVENTION

The present invention relates to an output signal processing device for an eddy-current sensor and an output signal processing method for the eddy-current sensor.

BACKGROUND ART

An eddy-current sensor is used for film thickness measurement, displacement measurement and so on. Hereinafter, an eddy-current sensor used for film thickness measurement is described as an example. An eddy-current sensor for film thickness measurement is used in a step of producing a semiconductor device (polishing step), for example. In such a polishing step, the eddy-current sensor is employed in the following manner. As semiconductor devices are highly integrated, wires in circuits are being made finer and distances between wires narrower. Accordingly, planarization of a surface of a semiconductor wafer that is an object to be polished is required, and polishing is performed by a polishing apparatus as a means of the planarization.

The polishing apparatus includes a polishing table for holding a polishing pad for polishing an object and a top ring for holding the object and pressing it against the polishing pad. Each of the polishing table and the top ring is rotationally driven by an actuator (such as a motor). An object is polished by spreading liquid (slurry) including a polishing agent over a polishing pad and pressing the object held on a top ring thereagainst.

In the polishing apparatus, if an object is insufficiently polished, a short circuit may possibly occur due to a lack of isolation between circuits, and, if the polishing is excessive, a reduced cross-sectional area of the wires causes a problem such as an increase of their resistance value or complete removal of the wires, which prevents formation of the circuit itself. Therefore, in polishing apparatus, it is required to detect an optimum end point of polishing.

Such a technology is disclosed in Japanese Patent Laid-Open No. 2005-121616. According to this technology, an eddy-current sensor including two coils, that is, a detection coil and a balance coil is employed to detect a polishing end point. As shown in FIG. 10 in Japanese Patent Laid-Open No. 2005-121616, a detection coil and a balance coil constitute a series circuit, the opposite ends of which are connected to a bridge circuit including a variable resistance. Adjusting the balance with the bridge circuit enables zero-point adjustment such that, when the film thickness is zero, the output of the bridge circuit is zero. The output of the bridge circuit is input to a synchronous detection circuit, as shown in FIG. 11 in Japanese Patent Laid-Open No. 2005-121616. The synchronous detection circuit extracts, from the input signal, a resistance component (R), a reactive component (X), an amplitude output (Z), and a phase output ($\tan^{-1}$ R/X) depending on a change of the film thickness.

With a detection method using a conventional bridge circuit, the amount of adjustment of the resistance value when zero-point adjustment is performed is significantly less than the magnitude of the total resistance value constituting the bridge circuit. As a result, the amount of change in temperature of the total resistance value is more considerable than the amount of adjustment of the resistance value when zero-point adjustment is performed. Due to a change in resistance value caused by a temperature change, a change in stray capacitance that the resistance has, a temporal change or the like, the bridge circuit has a property that is susceptibly influenced by a change in ambient environment of the resistance. As a result, a problem occurs that the zero point as described above is easily shifted, which reduces the precision of the measurement of the film thickness.

In other words, in the past, the output of the bridge circuit is adjusted such that the output of the bridge circuit is zero when the balance of the bridge circuit is adjusted with a variable resistance and no conductive film is present. However, there is a problem that the output of the bridge circuit is not zero because a parameter of the bridge circuit changes over time, throwing the bridge circuit off balance, because of the following factors: (i) The detection coil and the balance coil have values influenced by an ambient temperature; and (ii) Also in the variable resistance, the resistance value shifts with a mechanically variable mechanism.

An object of aspects of the present invention, which has been made to solve such a problem, is to provide an output signal processing device for an eddy-current sensor and an output signal processing method for an eddy-current sensor that is not easily influenced more than before by a change in an ambient environment or the like.

SUMMARY

In order to solve the problem, according to a first aspect, a configuration is adopted which is an output signal processing device for an eddy-current sensor having an exciting coil capable of forming eddy current in a conductor and a detection coil that detects the eddy current that can be formed in the conductor, the output signal processing device processing an output signal of the detection coil to be output by the eddy-current sensor, wherein the output signal processing device has an AC signal generator capable of generating a plurality of first AC generated signals having different amplitudes; and a retainer that holds reference data for identifying the first AC generated signal corresponding to the output signal that is a first reference state signal output from the detection coil in a first reference state, among the plurality of first AC generated signals, wherein, when a film thickness of the conductor is to be measured, the AC signal generator generates the first AC generated signal based on the reference data and outputs the first AC generated signal as a reference signal, wherein the output signal processing device further has a difference circuitry that, when a film thickness of the conductor is to be measured, receives input of the output signal that is a film thickness signal output from the detection coil and the reference signal output from the AC signal generator and acquires and outputs a film thickness amplitude that is a difference between the amplitude of the film thickness signal and the amplitude of the reference signal, and a data generator that, in the first reference state, measures an amplitude of the first reference state signal and generates the reference data.

According to a second aspect, a configuration is adopted which is the output signal processing device for the eddy-current sensor according to the first aspect, wherein the data generator in the first reference state measures a magnitude of an amplitude of the first reference state signal and holds amplitude data regarding the magnitude of the amplitude, wherein the data generator outputs amplitude designation data for designating the first AC generated signal to the AC signal generator, wherein the AC signal generator generates and outputs the first AC generated signal based on the amplitude designation data, and wherein the data generator measures a magnitude of an amplitude of the first AC generated signal output from the AC signal generator, compares the first AC generated signal with the amplitude data, and generates the reference data based on a result of the comparison.

According to a third aspect, a configuration is adopted which is the output signal processing device for the eddy-current sensor according to the second aspect, wherein if a first amplitude difference from the amplitude data is higher than a first amplitude-difference predetermined value or if the first amplitude difference is not at a minimum when compared with the amplitude data, the data generator changes the amplitude designation data such that the first amplitude difference is less than or equal to the first amplitude-difference predetermined value or is at the minimum and outputs the changed amplitude designation data to the AC signal generator until the first amplitude difference is less than or equal to the first amplitude-difference predetermined value or is at the minimum, and wherein as the reference data, the data generator determines the amplitude designation data when the first amplitude difference is less than or equal to the first amplitude-difference predetermined value or is at the minimum.

According to a fourth aspect, a configuration is adopted which is the output signal processing device for the eddy-current sensor according to the second or third aspect, wherein the data generator, in the first reference state, measures a phase of the first reference state signal and holds phase data regarding the phase, the AC signal generator can generate a plurality of second AC generated signals having different phases, the data generator outputs phase designation data for designating the second AC generated signal to the AC signal generator, the AC signal generator generates and outputs the second AC generated signal based on the phase designation data, and the data generator measures a phase of the second AC generated signal output from the AC signal generator, compares the second AC generated signal with the phase data, and generates the reference data based on a result of the comparison.

According to a fifth aspect, a configuration is adopted which is the output signal processing device for the eddy-current sensor according to the fourth aspect, wherein if a phase difference from the phase data is higher than a phase-difference predetermined value or if the phase difference is not at a minimum when compared with the phase data, the data generator changes the phase designation data such that the phase difference is less than or equal to the phase-difference predetermined value or is at the minimum and outputs the changed phase designation data to the AC signal generator until the phase difference is less than or equal to the phase-difference predetermined value or is at the minimum, and wherein the data generator includes, in the reference data, the phase designation data when the phase difference is less than or equal to the phase-difference predetermined value or is at the minimum.

According to a sixth aspect, a configuration is adopted which is the output signal processing device for the eddy-current sensor according to the fourth or fifth aspect, wherein (1) the data generator in the first reference state compares a magnitude of an amplitude of the first reference state signal and a magnitude of an amplitude of the first AC generated signal, if a second amplitude difference acquired by multiplying a difference between the compared amplitudes by more than 1 is higher than a second amplitude-difference predetermined value or if the second amplitude difference is not at a minimum, the data generator changes the amplitude designation data such that the second amplitude difference is less than or equal to the second amplitude-difference predetermined value or is at the minimum and outputs the changed amplitude designation data to the AC signal generator until the second amplitude difference is less than or equal to the second amplitude-difference predetermined value or is at the minimum, and as the reference data, the data generator determines the amplitude designation data when the second amplitude difference is less than or equal to the second amplitude-difference predetermined value or is at the minimum, and/or wherein (2) the data generator in the first reference state compares an amplitude of the first reference state signal and an amplitude of the second AC generated signal, if the second amplitude difference acquired by multiplying a difference between the compared amplitudes by more than 1 is higher than the second amplitude-difference predetermined value or if the second amplitude difference is not at a minimum, the data generator changes the phase designation data such that the second amplitude difference is less than or equal to the second amplitude-difference predetermined value or is at the minimum and outputs the changed phase designation data to the AC signal generator until the second amplitude difference is less than or equal to the second amplitude-difference predetermined value or is at the minimum, and as the reference data, the data generator determines the phase designation data when the second amplitude difference is less than or equal to the second amplitude-difference predetermined value or is at the minimum.

According to a seventh aspect, a configuration is adopted which is the output signal processing device for the eddy-current sensor according to any one of the first to sixth aspects, wherein in a second reference state after the first reference state, the AC signal generator generates the first AC generated signal corresponding to the first reference state signal based on the reference data and outputs the first AC generated signal as the reference signal, wherein, in the second reference state, the detection coil outputs a second reference state signal that is the output signal, wherein, in the second reference state, the difference circuitry receives input of the second reference state signal and the reference signal output from the AC signal generator and acquires a reference difference between an amplitude of the second reference state signal and an amplitude of the reference signal, wherein if the reference difference is higher than a reference-difference predetermined value, (1) the output signal processing device outputs an alarm signal, and/or (2) the data generator measures a magnitude of an amplitude of the second reference state signal output from the detection coil in the second reference state and updates and holds the reference data based on the measured amplitude of the second reference state signal.

According to an eighth aspect, a configuration is adopted which is the output signal processing device for the eddy-current sensor according to any one of the first to seventh aspects, wherein the output signal processing device has an amplifier that amplifies the film thickness amplitude.

According to a ninth aspect, a configuration is adopted which is the output signal processing device for the eddy-current sensor according to the eighth aspect, wherein the amplifier has an amplification factor for amplifying the film thickness amplitude that is variable in accordance with a film thickness of the conductor.

According to a tenth aspect, a configuration is adopted which is the output signal processing device for the eddy-current sensor according to any one of the first to ninth aspects, wherein, when a film thickness of the conductor is measured, when the film thickness of the conductor is larger than a film-thickness predetermined value, the AC signal generator generates a DC signal and outputs the DC signal as the reference signal, and wherein the difference circuitry receives input of the film thickness signal output from the detection coil and the DC signal output from the AC signal generator, acquires a difference between an amplitude of the film thickness signal and an amplitude of the DC signal, and determines the difference as the film thickness amplitude.

According to an eleventh aspect, a configuration is adopted which is a polishing apparatus having the output signal processing device for the eddy-current sensor according to any one of the first to tenth aspects, wherein the polishing apparatus polishes the conductor, the polishing apparatus including a polisher configured to polish the conductor, the eddy-current sensor configured to form the eddy current in the conductor and detect the formed eddy current for measuring a film thickness of the conductor, and a film-thickness calculator configured to acquire the film thickness from the film thickness amplitude output from the difference circuitry.

According to a twelfth aspect, a configuration is adopted which is an output signal processing method for an eddy-current sensor having an exciting coil capable of forming eddy current in a conductor and a detection coil that detects the eddy current that can be formed in the conductor, the output signal processing method processing an output signal of the detection coil to be output by the eddy-current sensor, wherein an AC signal generator generates a plurality of first AC generated signals having different amplitudes, a retainer holds reference data for identifying the first AC generated signal corresponding to the output signal that is a first reference state signal output from the detection coil in a reference state, among the plurality of first AC generated signals, wherein, when a film thickness of the conductor is to be measured, the AC signal generator generates the first AC generated signal corresponding to the first reference state signal based on the reference data and outputs the first AC generated signal as a reference signal, wherein, when a film thickness of the conductor is to be measured, a difference circuitry receives input of the output signal that is a film thickness signal output from the detection coil and the reference signal output from the AC signal generator and acquires a film thickness amplitude that is a difference between an amplitude of the film thickness signal and an amplitude of the reference signal, and wherein a data generator in the first reference state measures an amplitude of the first reference state signal and generates the reference data.

BRIEF DESCRIPTION OF DRAWINGS

FIG. 3A is a block diagram showing a configuration of an eddy-current sensor assembly, and FIG. 3B is an equivalent circuit schematic of the eddy-current sensor assembly;

DESCRIPTION OF EMBODIMENTS

Embodiments of the invention are described hereinafter with reference to drawings. It should be noted that an identical number is given to an identical or corresponding member, and repetitive descriptions may be omitted. Also, features described in each embodiment is applicable to other embodiments unless mutually incompatible.

Figure 1:
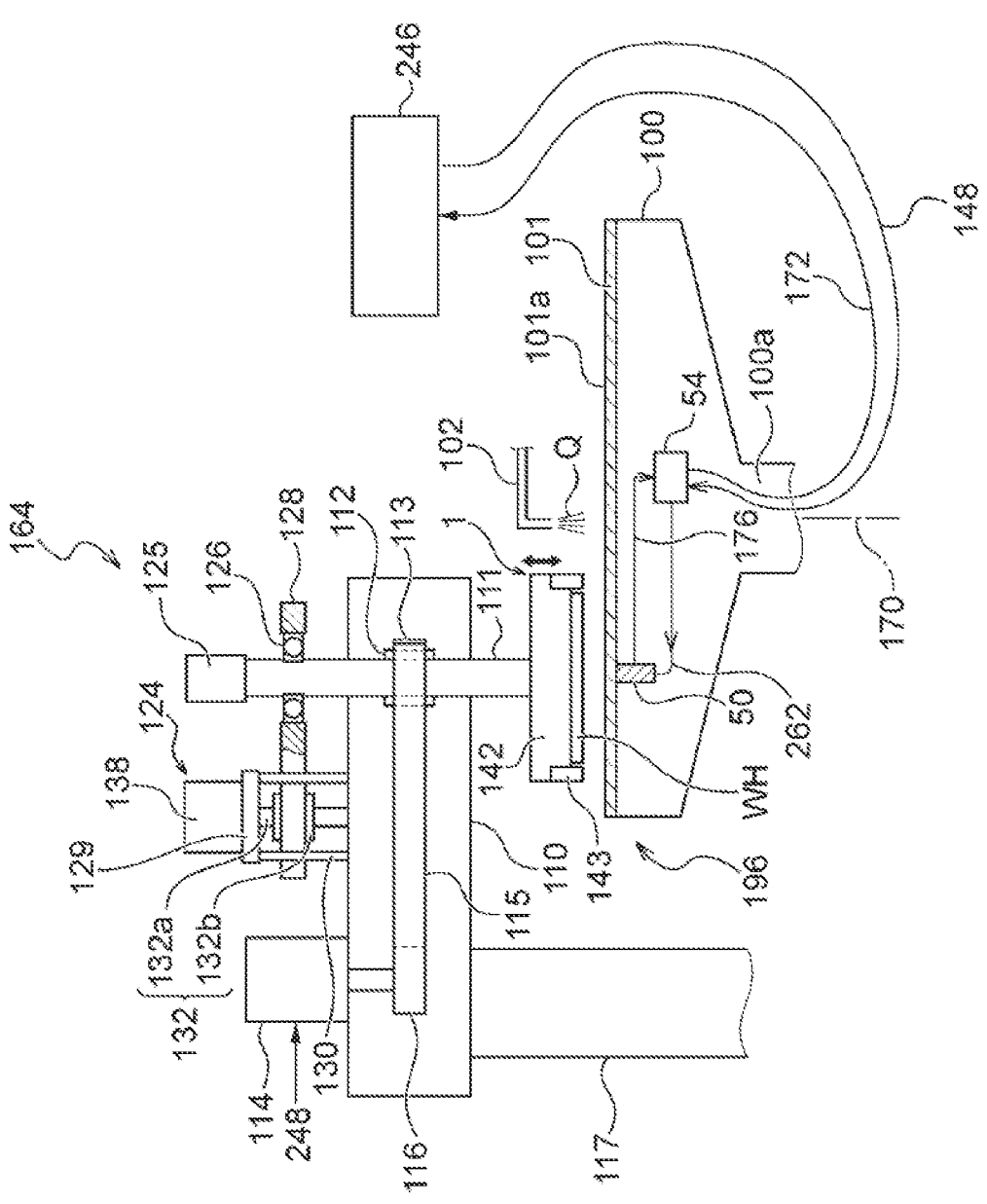
FIG. 1 is a schematic diagram showing a general configuration of a polishing apparatus according to one embodiment of the present invention.

FIG. 1 is a schematic diagram showing a general configuration of a polishing apparatus to which an output signal processing device for an eddy-current sensor according to one embodiment of the present invention is applied. As shown in FIG. 1, the polishing apparatus includes a polishing table 100 and a top ring (holding device) 1 that holds a substrate such as a semiconductor wafer that is an object to be polished and presses it against a polishing surface on the polishing table.

The polishing table 100 is joined to a motor (not shown) that is an actuator disposed thereunder via a table axis 170 and is rotatable about the table axis 170. The polishing table 100 has an upper surface to which a polishing pad 101 is attached, and a surface 101*a* of the polishing pad 101 constitutes a polishing surface for polishing a semiconductor wafer WH. A polishing-fluid supply nozzle 102 is installed above the polishing table 100, and, via the polishing-fluid supply nozzle 102, a polishing fluid Q is supplied onto the polishing pad 101 on the polishing table 100. As shown in FIG. 1, an eddy-current sensor 50 is buried in an internal part of the polishing table 100.

A top ring 1 is basically composed of a top ring body 142 that presses the semiconductor wafer WH against the polishing surface 101a and a retainer ring 143 that holds an outer circumferential edge of the semiconductor wafer WH to prevent the semiconductor wafer WH from jumping out of the top ring.

The top ring 1 is connected to a top-ring shaft 111, and the top-ring shaft 111 vertically moves relative to a top-ring head 110 via a vertical movement mechanism 124. This vertical movement of the top-ring shaft 111 moves the entire top ring 1 up and down and positions there relative to the top-ring head 110. It should be noted that a rotary joint 125 is attached to an upper end of the top-ring shaft 111.

The top-ring shaft 111 and the vertical movement mechanism 124 that vertically moves the top ring 1 include a bridge 128 that rotatably supports the top-ring shaft 111 via a bearing 126, a ball screw 132 that is attached to the bridge 128, a fulcrum 129 that is supported by a support rod 130, and a servomotor 138 that is provided on the fulcrum 129. The fulcrum 129 that supports the servomotor 138 is fixed to the top-ring head 110 via the support rod 130.

The ball screw 132 includes a screw axis 132a that is joined to the servomotor 138 and a nut 132b with which the screw axis 132a is threadedly engaged. The top-ring shaft 111 vertically moves integrally with the bridge 128. Therefore, when the servomotor 138 is driven, the bridge 128 vertically moves via the ball screw 132, and the top-ring shaft 111 and the top ring 1 thus vertically move.

Also, the top-ring shaft 111 is joined to a rotating cylinder 112 via a key (not shown). This rotating cylinder 112 includes a timing pulley 113 at its outer circumference. A top-ring motor 114 is fixed to the top-ring head 110, and the timing pulley 113 above is connected through a timing belt 115 to a timing pulley 116 provided in the top-ring motor 114. Therefore, rotationally driving the top-ring motor 114 integrally rotates the rotating cylinder 112 and top-ring shaft 111 through the timing pulley 116, timing belt 115, and timing pulley 113, and the top ring 1 rotates. It should be noted that the top-ring head 110 is supported by a top-ring head shaft 117 rotatably supported by a frame (not shown).

In the polishing apparatus configured as shown in FIG. 1, the top ring 1 can hold a substrate such as a semiconductor wafer WH on its bottom surface. The top-ring head 110 is configured to be able to turn about the top-ring head shaft 117, and the top ring 1 holding the semiconductor wafer WH at its bottom surface moves from a receiving position for the semiconductor wafer WH to an upper part of the polishing table 100 when the top-ring head 110 turns. Then, the top ring 1 is moved down, and the semiconductor wafer WH is pressed against the surface (polishing surface) 101a of the polishing pad 101. Here, the top ring 1 and the polishing table 100 are each rotated, and a polishing fluid Q is supplied from the polishing-fluid supply nozzle 102 provided above the polishing table 100 onto the polishing pad 101. In this way, the semiconductor wafer WH is brought into sliding contact with the polishing surface 101a of the polishing pad 101 to polish the surface of the semiconductor wafer WH.

Figure 2:
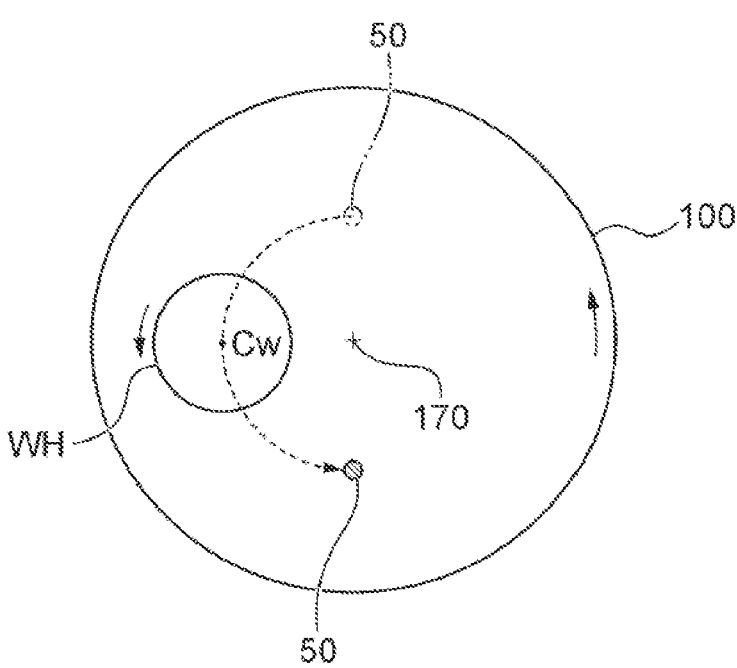
FIG. 2 is a top-down view showing a relationship among a polishing table, an eddy-current sensor, and a semiconductor wafer.

FIG. 2 is a top-down view showing a relationship among a polishing table 100, an eddy-current sensor 50, and a semiconductor wafer WH. As shown in FIG. 2, the eddy-current sensor 50 is installed at a position that passes through a center Cw of the semiconductor wafer WH which is held in the top ring 1 and is being polished. The polishing table 100 rotates around a rotation center 170. For example, the eddy-current sensor 50 can detect a metal film (conductive film) such as a Cu layer of the semiconductor wafer WH continuously on a trajectory (scan line) while passing through under the semiconductor wafer WH.

Figure 3A:
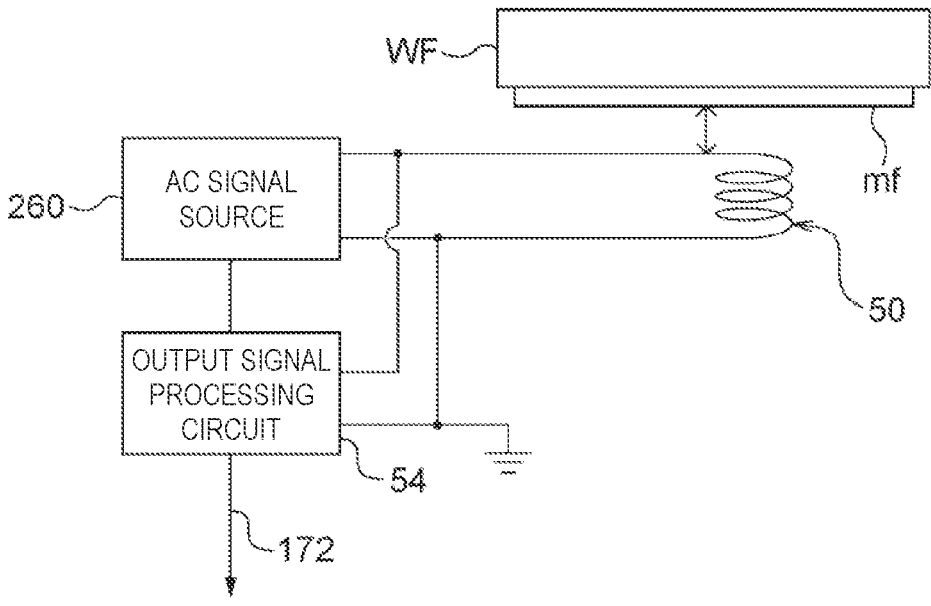
FIGS. 3A and 3B are diagrams showing a configuration of an eddy-current sensor assembly.
Figure 3B:
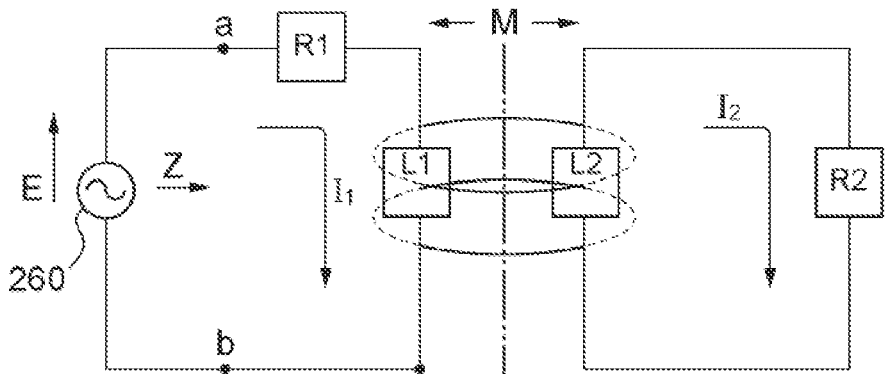

Next, the eddy-current sensor 50 included in the polishing apparatus according to the present invention is described with reference to the accompanying drawings. FIG. 3 is a diagram showing a configuration of the eddy-current sensor assembly including the eddy-current sensor 50, and FIG. 3A is a block diagram showing a configuration of an eddy-current sensor assembly, and FIG. 3B is an equivalent circuit schematic of the eddy-current sensor assembly; As shown in FIG. 3A, the eddy-current sensor 50 is disposed in vicinity of a metal film (or conductive film) mf to be detected and has a coil to which an AC signal source 260 is connected. Here, the conductor mf to be detected is a thin film of Cu, Al, Au, W, or the like formed on the semiconductor wafer WH, for example. The eddy-current sensor 50 is disposed in vicinity of a metal film (or conductive film) to be detected at approximately 1.0-4.0 mm, for example. The coil is typically wound around a magnetic body (not shown) of ferrite or the like. The eddy-current sensor 50 may be an air-core coil.

An impedance is changed by an eddy current occurring in the conductor mf, and from the impedance change, a signal detection called an impedance type by an eddy-current sensor detects a metal film (or conductive film). In other words, in the equivalent circuit shown in FIG. 3B, a change in eddy current I2 changes an impedance Z, and when the impedance Z changes viewed from a signal source (fixed frequency oscillator) 260, an output signal processing circuit 54 detects the change in impedance Z, and a change in the metal film (or conductive film) can be detected by the impedance type eddy-current sensor.

The impedance type eddy-current sensor can extract signal outputs X, Y, a phase, a synthetic impedance Z (=X+iY). From impedance components X, Y or the like, measurement information regarding a film thickness of a metal film (or conductive film) Cu, Al, Au or W is acquired. The eddy-current sensor 50 may be internally provided at a position near an inner surface of the polishing table 100, as shown in FIG. 1, is positioned to face a semiconductor wafer to be polished through a polishing pad, and can detect a change in a metal film (or conductive film) from eddy current flowing in the metal film (or conductive film) on the semiconductor wafer.

As a frequency of the eddy-current sensor, single radio wave, AM modulated radio wave, a sweep output of a function generator, or the like may be employed, and selection of an oscillating frequency and a modulation method with high sensitivity that match the film type of the metal film is preferable.

Such an impedance type eddy-current sensor is specifically described below. The AC signal source 260 has an oscillator with a fixed frequency of approximately 2-30 MHz, for example. The oscillator is, for example, crystal oscillator. Then, with the AC voltage supplied from the AC signal source 260, current $I_1$ is fed to the eddy-current sensor 50. When current flows in the eddy-current sensor 50 disposed in vicinity of the metal film (or conductive film) mf, the magnetic flux is interlinked with the metal film (or conductive film) mf so that mutual inductance M is formed therebetween, and eddy current $I_2$ is fed into the metal film (or conductive film) mf. Here, R1 designates equivalent resistance on a primary side including the eddy-current sensor, and L1 designates self-inductance also on the primary side including the eddy-current sensor. On the side having the metal film (or conductive film) mf, R2 designates equivalent resistance corresponding to an eddy current loss, and L2 designates self-inductance thereof. The impedance Z as viewed from terminals a, b of the AC signal source 260 to the eddy-current sensor side varies in accordance with the magnitude of the eddy current loss formed in the metal film (or conductive film) mf.

Figure 4:
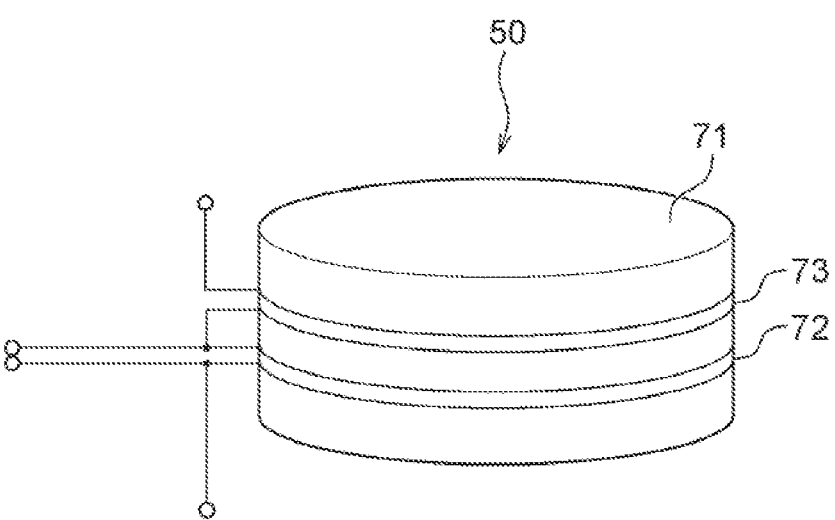
FIG. 4 is a schematic diagram showing an exemplary configuration of coils in an eddy-current sensor according to a conventional technology.

Next, an exemplary configuration of the coils in the eddy-current sensor 50 of this embodiment is described. FIG. 4 is a schematic diagram showing an exemplary configuration of the coils in the eddy-current sensor 50. The eddy-current sensor 50 has an exciting coil 72 for forming eddy-current in a metal film (or conductive film) on a semiconductor wafer WH and a detection coil 73 for detecting the generated eddy current. The eddy-current sensor 50 includes two coil layers, the exciting coil 72 and the detection coil 73, wound around a ferrite core 71. It should be noted that the structure of the ferrite core 71 is not limited to the structure shown in FIG. 4, but any arbitrary structure may be adopted. Referring to FIG. 4, the exciting coil 72 and the detection coil 73 are axially disposed around a cylindrical ferrite core.

The exciting coil 72 is connected to the AC signal source 260. With the magnetic field formed by voltage supplied from the AC signal source 260, the exciting coil 72 forms eddy current in the metal film (or conductive film) mf on the semiconductor wafer WH disposed in vicinity of the eddy-current sensor 50. On an upper side (or the side having the metal film (or conductive film)) of the ferrite core, the detection coil 73 is disposed and detects a magnetic field generated by the eddy current formed in the metal film (or conductive film). It should be noted that, according to the present invention, the eddy-current sensor 50 does not have a balance coil.

Figure 5:
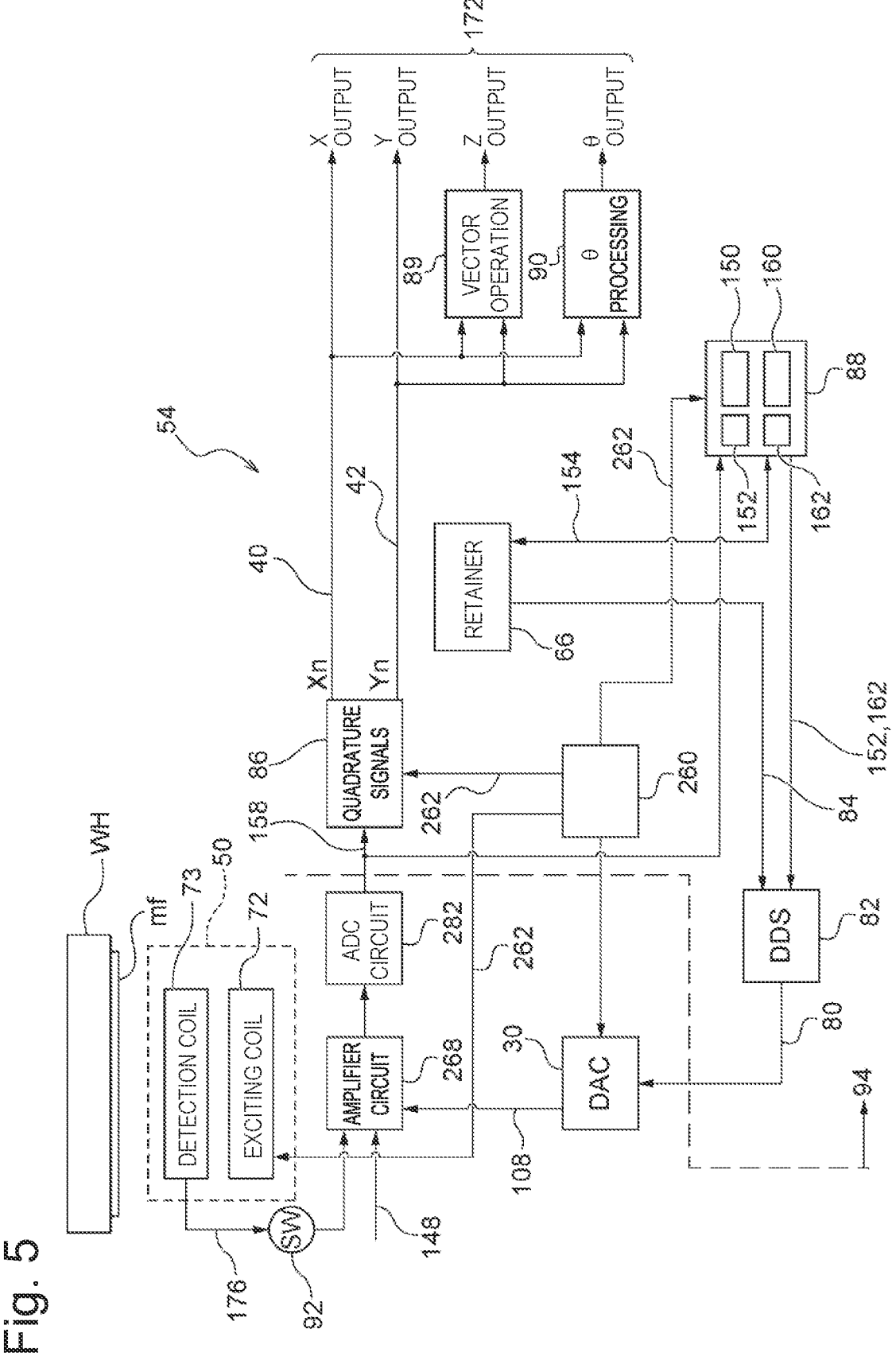
FIG. 5 is a block diagram showing an output signal processing circuit in an eddy-current sensor according to one embodiment of the present invention.

FIG. 5 is a block diagram showing an output signal processing circuit 54 in the eddy-current sensor according to one embodiment of the present invention. The output signal processing circuit 54 processes an output signal 176 of the detection coil 73, which is output from the eddy-current sensor 50 having the exciting coil 72 that detects eddy current that can be formed in a conductor mf and the detection coil 73 that detects eddy current that can be formed in the conductor. The output signal processing circuit 54 has an AC signal generator 82 capable of generating a plurality of first AC generated signals 80 having different amplitudes and a retainer 66 that holds reference data 84 for identifying a first AC generated signal 80 corresponding to the output signal 176 that is a first reference state signal output from the detection coil 73 in a first reference state among the plurality of first AC generated signals 80.

According to this embodiment, as the AC signal generator 82, a direct digital synthesizer (DDS) function generator, for example, may be used. The function generator can output an arbitrary frequency/waveform. In this embodiment, the AC signal generator 82 can output a sinusoidal signal. The direct digital synthesizer (DDS) to be used for generating an output waveform is a method that generates a signal having a frequency and a phase that are adjusted based on a fixed frequency clock reference. According to DDS method, wavelength data having a fixed clock is saved in memory in advance. The data is modified in accordance with the frequency, amplitude, and phase set by a user and is retrieved from the memory. For example, for the phase, the function generator determines an increment of phase and, at the same time, retrieves the waveform data. The waveform generated by the AC signal generator 82 is converted to an analog waveform in and is output from the digital-to-analog converter circuit 30. Any signal generator other than DDS function generator may be used if it can generate a signal having the frequency, amplitude, and phase set by a user. When a commercially available signal generator is employed, the reference data 84 held by the retainer 66 may be input to the commercially available signal generator after converted within the AC signal generator 82 so as to be compatible with the commercially available signal generator.

When a film thickness of a conductor is to be measured, the output signal processing circuit 54 generates a first AC generated signal 80 based on the reference data 84 and outputs it as a reference signal. The output signal processing circuit 54 further has an amplifier circuit 268 (difference circuitry) that, when a film thickness of a conductor is to be measured, receives input of the output signal 176 that is a film thickness signal output from the detection coil 73 and a reference signal output from the AC signal generator 82, acquires a film thickness amplitude that is a difference between an amplitude of the film thickness signal and an amplitude of the reference signal, and amplifies and then outputs the film thickness amplitude, and a data generator 88 that measures an amplitude of a first reference state signal in a first reference state and generates the reference data 84. The output signal processing circuit 54 is a circuit following a switch SW to which the output signal 176 of the detection coil 73 is input as in FIG. 5.

According to this embodiment, a balance coil is not used. This can reduce the factors that throws the bridge circuit off balance or can preclude such factors, and the problem can be therefore solved. In other words, an output signal processing device for an eddy-current sensor that is not easily influenced more than before by a change in an ambient environment or the like can be provided.

The output signal 176 is input to a + terminal of the amplifier circuit 268, and a signal 108 that is a reference signal is input to a − terminal of the amplifier circuit 268. The signal 108 input to the − terminal has a sign inverted within the amplifier circuit 268 and is added to the output signal 176 input to + terminal. In other words, the amplifier circuit 268 acquires a difference between the output signal 176 input to the + terminal and the signal 108 input to the − terminal.

The output signal processing circuit 54 has the retainer 66. The retainer 66 holds the reference data 84 for identifying the first AC generated signal 80 corresponding to the output signal 176 output from the detection coil 73 in a reference state and outputs the reference data 84 for measuring a film thickness. Details of a method for generating the reference data 84 are described below. Here, the expression "corresponding to the output signal 176 output in a reference state" refers to a fact that the output signal 176 and the first AC generated signal 80 have amplitudes that are at least substantially the same. The output signal 176 and the first AC generated signal 80 are typically not required to have frequencies that are substantially matched since it is considered that they have the same frequency. However, when their frequencies are different and, therefore, it is clear that a measurement error will occur, the expression "corresponding to the output signal 176 output in a reference state" embraces a fact that their frequencies are substantially matched. When a less phase shift exists between the output signal 176 and the first AC generated signal 80, it is not required that their phases are substantially matched. However, when their phases are different and, therefore, it is clear that a measurement error will occur, the expression "corresponding to the output signal 176 output in a reference state"

embraces a fact that their phases are substantially matched. Here, the expressions "have amplitudes that are at least substantially the same" and "phases or frequencies are substantially matched" embrace a case where a difference in amplitude, phase, and/or frequency falls within a predetermined error value range set for each of the amplitude, phase, and frequency.

The output signal processing circuit 54 has the AC signal generator 82. The AC signal generator 82 identifies based on the reference data 84 output from the retainer 66, generates and outputs first and second AC generated signals 80 (reference signals) corresponding to the output signals 176 output from the detection coil 73 in the reference state. It may be said that the first AC generated signal 80 corresponding to the output signals 176 output from the detection coil 73 in the reference state is a reference signal that can cancel the output from the detection coil 73 in the reference state. For film thickness measurement, the output signal processing circuit 54 has a function to process an output from the detection coil 73 to generate a signal depending on the film thickness.

It should be noted that a difference between the first AC generated signal 80 and the second AC generated signal 80 is as follows. The first AC generated signal 80 is an AC generated signal 80 that has the same phase and a different amplitude generated by the AC signal generator 82 in amplitude adjustment, and the second AC generated signal 80 is an AC generated signal 80 that has the same amplitude and a different phase generated by the AC signal generator 82 in phase adjustment. The term "AC generated signal 80" refers to a signal output from the AC signal generator 82 when an amplitude and/or a phase are not adjusted (or when no distinction is necessary between the first AC generated signal 80 and the second AC generated signal 80).

Here, the term "reference state" refers to a state that no conductor is present in vicinity of the detection coil 73, for example. The state that no conductor is present in vicinity of the detection coil 73 is, for example, one of the following states: (i) The top ring 1 exists on the polishing table 100, but the detection coil 73 does not exist under the semiconductor wafer WH, (ii) the top ring 1 that holds the semiconductor wafer WH does not exist on the polishing table 100, (iii) The top ring 1 exists on the polishing table 100, but the top ring 1 is not holding the semiconductor wafer WH, (iv) The top ring 1 exists on the polishing table 100, but the top ring 1 is holding a wafer for calibration in which no conductive film is formed (or zero film thickness).

Also, the term "reference state" may refer to a state that a conductor is in vicinity of the detection coil 73. It corresponds to, for example, a state that the top ring 1 exists on the polishing table 100 and a wafer having a conductive film of a predetermined thickness for calibration is held by the top ring 1.

The reference data 84 is, for example, an amplitude of the output signal 176 from the eddy-current sensor 50 in the reference state. The reference data 84 may not be an amplitude itself. For example, it may be an amount proportional to an amplitude. This is because, if it is an amount proportional to an amplitude, the AC signal generator 82 can acquire an amplitude from the reference data 84 and identify a first AC generated signal corresponding to the output signal 176. Furthermore, it is because, if it is an amount from which a relationship with an amplitude can be determined instead of an amount proportional to an amplitude, the AC signal generator 82 can acquire an amplitude from the reference data 84 and identify a first AC generated signal corresponding to the output signal 176. For example, a relationship between an amplitude and the reference data 84 may be given in a table format to the AC signal generator 82. Also, because the reference data 84 is for identifying a first AC generated signal, a relationship between the first AC generated signal and the reference data 84 may be given in such as a table format to the AC signal generator 82. Further, the reference data 84 may include information such as the phase, frequency, waveform, timing, or the like of the first AC generated signal.

With reference to FIG. 5, a configuration and operations of the output signal processing circuit 54 for film thickness measurement are described. FIG. 5 is a block diagram showing the output signal processing circuit 54 in the eddy-current sensor. FIG. 5 shows an exemplary measurement circuit for an impedance Z when the eddy-current sensor 50 side is viewed from the AC signal source 260 side. In the measurement circuit (that is, the output signal processing circuit 54) for an impedance Z shown in FIG. 5 can extract a resistance component (X), a reactance component (Y), an amplitude output (Z), and a phase output ($\tan^{-1}$ Y/X) depending on a change of the film thickness.

As described above, the signal source 260 supplies an AC signal to the eddy-current sensor 50 disposed in vicinity of a semiconductor wafer WH on which a metal film (or a conductor mf) to be detected is deposited. The signal source 260 is a fixed-frequency oscillator composed of a crystal oscillator. The signal source 260 supplies voltage with a fixed frequency of, for example, 2 MHz, 8 MHz, or 16 MHz. From the output signal 176 detected by the eddy-current sensor 50 after passing through the amplifier circuit 268 and an analog-to-digital converter circuit 282 (ADC), a cos component 40 and a sin component 42 of the detected signal by a quadrature-signals detection circuit 86 including a cos synchronous detection circuit (not shown) and a sin synchronous detection circuit (not shown) are retrieved. Here, from an output 262 of the signal source 260, two signals of an in-phase component)(0° (not shown) and an orthogonal component)(90° (not shown) of the signal source 260 are formed by a phase shift circuit (not shown) within the quadrature-signals detection circuit 86, which are respectively introduced to a cos synchronous detection circuit and a sin synchronous detection circuit where the aforementioned synchronous detection is performed thereon.

The signals having undergone the synchronous detection are a resistance component (X output 40) that is a cos synchronous detection output and a reactance component (Y output 42) that is a sin synchronous detection output. Also, by a vector operation circuit 89, $(X^2+Y^2)^{1/2}$ that is an amplitude output (Z output) is acquired from the resistance component (X output 40) and the reactance component (Y output 42). Also, by a θ processing circuit 90, in the same manner, ($\tan^{-1}$ X/Y) that is a phase output (θ output) is acquired from the resistance component output and the reactance component output.

According to one embodiment of the present invention shown in FIG. 5, compared to a conventional technology, in the past, the output of the bridge circuit is adjusted such that the output of the bridge circuit is zero when the balance of the bridge circuit is adjusted with variable resistance and no conductive film is present. However, there is a problem that the output of the bridge circuit is not zero because a parameter of the bridge circuit changes over time, throwing the bridge circuit off balance, because of the following factors: (i) The detection coil and the balance coil have fluctuating values influenced by an ambient temperature; and (ii) Also in the variable resistance, the resistance value shifts with a mechanically variable mechanism. The eddy-current sensor 50 in FIG. 5 does not use a balance coil and a bridge circuit. This can reduce the factors that throws the bridge circuit off balance or can preclude such factors, and the problem can be therefore solved.

The processing circuit following the analog-to-digital converter circuit 282 is a digital signal processor 94. The digital signal processor 94 can be composed of a digital signal processing circuit, for example, programmable gate array (PGA) or a field programmable gate array (FPGA). The digital signal processor 94 can further be composed of a CPU, a memory, a recording medium, and software stored in the recording medium for causing components of the digital signal processor 94 to perform predetermined operations. It should be noted that the reference data 84 held in the retainer 66 may be data acquired by the output signal processing circuit 54 in another polishing apparatus. It is possible in cases including, for example, a case where variance among outputs from the detection coil 73 is small, a case where a precision requirement for outputs from the detection coil 73 is not strict, or the like.

Figure 6:
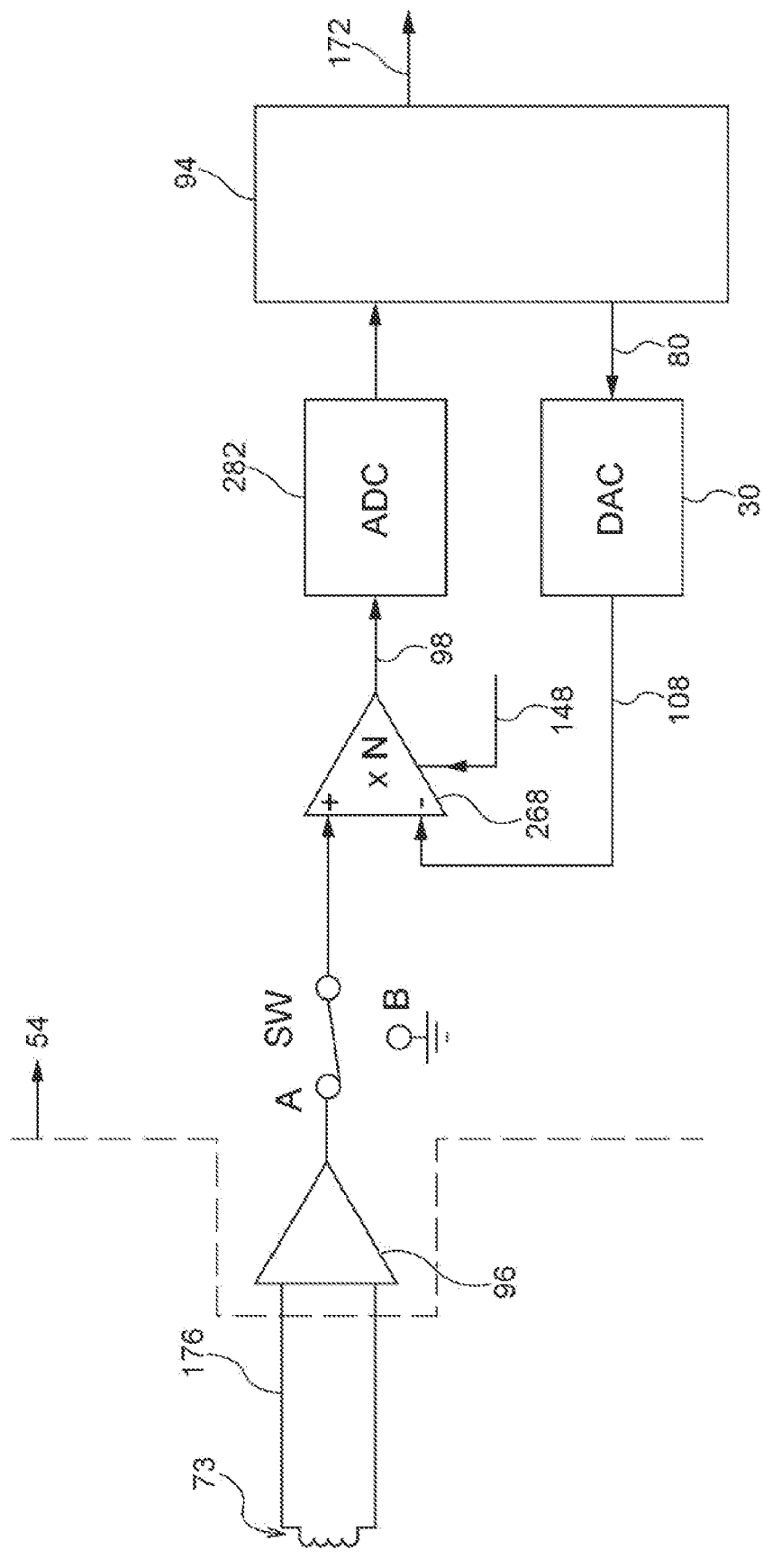
FIG. 6 is a block diagram showing a detail configuration of an amplifier circuit and so on for measuring a film thickness.

Next, detailed operations of the amplifier circuit 268 (difference circuitry) and so on for measuring a film thickness are described. FIG. 6 is a block diagram for describing detail operations of the amplifier circuit 268 and so on for measuring a film thickness. An output signal 176 from the detection coil 73 is input to the output signal processing circuit 54 and is first amplified by a pre-amplifier 96. The pre-amplifier 96 may not be provided. To the amplifier circuit 268, the output signal 176 that is a film thickness signal output from the detection coil 73 and a first AC generated signal 80 that is a reference signal output from the output AC signal generator 82 are input. The amplifier circuit 268 acquires and outputs a film thickness amplitude that is a difference between an amplitude of a film thickness signal and an amplitude of a reference signal. The first AC generated signal 80 is generated by the AC signal generator 82 and is converted to an analog signal by the digital-to-analog converter circuit 30. The output signal 176 is input to the amplifier circuit 268 through the switch SW. Functions of the switch SW are described later.

The amplifier circuit 268 increases the film thickness amplitude to N times and outputs it as a signal 98 to the analog-to-digital converter circuit 282. N is greater than 1, preferably greater than or equal to 2. The amplifier circuit 268 has an amplification factor determined by a signal 148 output from the end-point detection controller 246 shown in FIG. 1. The signal 148 indicates an amplification factor. The end-point detection controller 246 is described later. The amplification factor differs between a reference state and the film thickness measurement mode. The amplification factor in the film thickness measurement mode is described later.

The film thickness amplitude is amplified in the amplifier circuit 268 because of the following reason: For a thin film, a change in eddy current caused by a change in the film thickness is small. Therefore, for accurate measurement of a film thickness, it is required to detect eddy current with high sensitivity. In order to detect eddy current with high sensitivity, it is required for the detection coil 73 to detect a small change in a magnetic field generated by eddy current. In a case where no bridge circuit is used, that is, no dummy coil is used but only one detection coil 73 is used to detect a magnetic field, a change in eddy current caused by a change in film thickness, that is, a small change of the output signal 176 cannot be amplified disadvantageously.

The reason why a small change cannot be amplified is as follows. For film thickness measurement, a changed portion of the output signal 176 is required to be detected with high precision from the output signal 176 of the detection coil. This is because the changed portion of the output signal 176 indicates a polished amount. In order to detect with high precision (that is, to increase the sensitivity), it is required to amplify an input signal to the detection circuit or to reduce noise of the detection circuit. When high-performance ADC (for example, 14-bit, 200-Msps ADC) is used, noise of the detection circuit can be reduced. However, the amplitude cannot be increased. This is because, although a changed portion of the output signal 176 is to be detected with high precision, the output signal 176 has a large amplitude, and, if the whole output signal 176 is amplified, the amplitude of the changed portion in the amplified output signal 176 does not have an adequate signal level because of a limited dynamic range that can be processed by the signal processing circuit.

Accordingly, as already described, a changed portion of the output signal 176 that is an input signal to the detection circuit is only amplified. That is, the output signal 176 of the detection coil 73 in a reference state where the detection coil 73 is located externally, for example, to the semiconductor wafer WH is canceled by using the first AC generated signal 80 generated by the AC signal generator 82. Because of the cancellation, only the changed portion of a received signal (output signal 176) when eddy current is occurring in an inner part of the semiconductor wafer WH in the film thickness measurement mode can be amplified with an adequate factor, which improves the detection sensitivity.

Figure 7A:
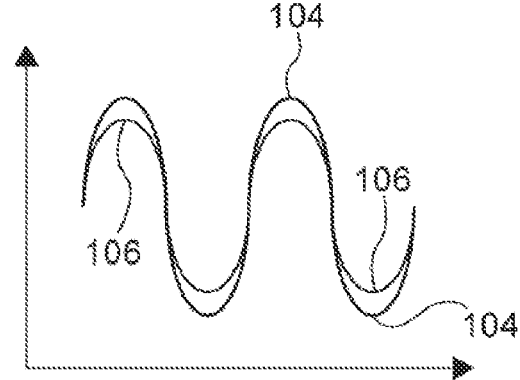
FIGS. 7A, 7B and 7C are diagrams showing signals when a film thickness is measured.

Referring to FIG. 7A, a signal 104 is the output signal 176 of the detection coil 73 in the reference mode where the semiconductor wafer WH does not exist in vicinity of the eddy-current sensor 50. At that time, the output signal 176 has a large amplitude. Referring to FIG. 7A, a signal 106 is the output signal 176 of the detection coil 73 in the film thickness measurement mode where the semiconductor wafer WH exists in vicinity of the eddy-current sensor 50. At that time, the amplitude of the output signal 176 is changed from that of the reference mode. FIG. 7A shows a horizontal axis indicating time (in seconds: s) and a vertical axis indicating voltage (in volts: V). Although the signal 104 and the signal 106 occur at different times, they are shown with a matched time axis to clearly show that their amplitudes are only slightly different. The signal 104 and the signal 106 are sinusoidal waves in this embodiment.

Figure 7B:
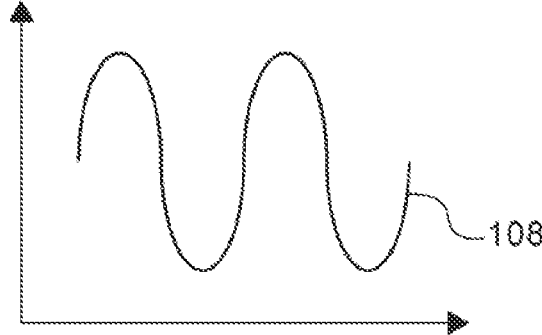

A signal 108 in FIG. 7B is an AC generated signal 80 for cancellation that is generated by the AC signal generator 82 and is output through the digital-to-analog converter circuit 30. Since a difference between the signal 106 and the signal 108 is amplified by the amplifier circuit 268 in FIG. 6, a signal 98 input to the digital signal processor 94 is a signal having a small changed portion that is only amplified largely. FIG. 7B shows a horizontal axis indicating time (in seconds: s) and a vertical axis indicating voltage (in volts: V). The signal 108 is a sinusoidal wave so as to match the signal 104 and the signal 106, in this embodiment. In a case where the signal 104 and the signal 106 are not sinusoidal waves, the signal 108 can have a waveform other than sinusoidal waves so as to match the waveforms of the signal 104 and the signal 106. It should be noted that, even in a case where the signal 104 and the signal 106 are not sinusoidal waves, when the signal 104 and the signal 106 are close to sinusoidal waves, the signal 108 can be a sinusoidal wave.

Figure 7C:
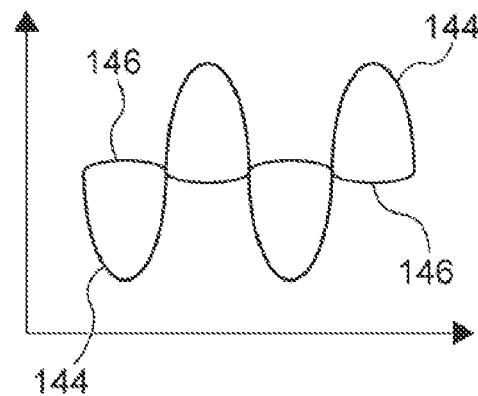

FIG. 7C shows a signal 98 output from the amplifier circuit 268. A signal 146 is the output signal 98 of the amplifier circuit 268 in the reference mode where the semiconductor wafer WH does not exist in vicinity of the eddy-current sensor 50. At that time, the output signal 98 has the smallest amplitude. Referring to FIG. 7C, a signal 144 is the output signal 98 of the amplifier circuit 268 in the film thickness measurement mode where the semiconductor wafer WH exists in vicinity of the eddy-current sensor 50. At that time, the output signal 98 has a significantly larger amplitude than that in the reference mode. FIG. 7C shows a horizontal axis indicating time (in seconds: s) and a vertical axis indicating voltage (in volts: V). Although the signal 144 and the signal 146 occur at different times, they are shown with a matched time axis to clearly show that the difference between their amplitudes more largely changes, compared to that in FIG. 7A. The signal 144 and the signal 146 are sinusoidal waves in this embodiment.

Next, detail operations of the switch SW, the amplifier circuit 268 (difference circuitry), the data generator 88 and so on in the reference state are described with reference to FIGS. 5 and 8. In the reference state, a calibration is performed to acquire data required for generating a reference signal. In the reference state, an amplitude and a phase of the output signal 176 are first measured. Next, a work is performed to adjust the AC signal generator 82 such that the AC signal generator 82 generates a reference signal having an amplitude and phase that match the amplitude and phase of the measured output signal 176.

FIG. 8 is a block diagram for describing detail operations of the switch SW, the amplifier circuit 268 and so on for measuring an amplitude and a phase in the reference state. The reference state includes a first reference state and a second reference state. The data generator 88 in the first reference state measures an amplitude of a first reference state signal and generates reference data 84.

Here, a difference between the first reference state and the second reference state is described. Both of the first reference state and the second reference state are the already described reference state. A reference state that precedes in time is called a first reference state, and a reference state that is subsequent in time to the first reference state is called a second reference state. In a case where the reference data 84 generated first in the first reference state is displaced from the output signal 176 in the latest reference state due to passage of time, when it is determined that the reference data 84 is required to be updated, the latest reference state for generating new reference data 84 is called a second reference state. It should be noted that the first reference state includes a reference state when the reference data 84 does not exist (for example, immediately after the polishing apparatus is shipped from factory) or when the generated reference data 84 is lost or invalid. The time difference between the first reference state and the second reference state may be a short period of time enough for the polishing table 100 to perform one rotation or a long period of time such as one hour or one week.

In the first reference state, the data generator 88 measures the magnitude of the amplitude of the output signal 176 (first reference state signal) and holds amplitude data 150 (see FIG. 5) regarding the magnitude of the amplitude. The magnitude of the amplitude is measured in a manner as described below. The end-point detection controller 246 outputs a signal 148 indicating an amplification factor to the amplifier circuit 268. The amplification factor in the first reference state is "1" as shown in the amplifier circuit 268 in FIG. 8A. The data generator 88 outputs amplitude designation data 152 to the AC signal generator 82 such that 0 volt (0 V) signal is output. As a result, the output signal 176 input to the amplifier circuit 268 is unchanged and is output from the amplifier circuit 268.

Figure 9A:
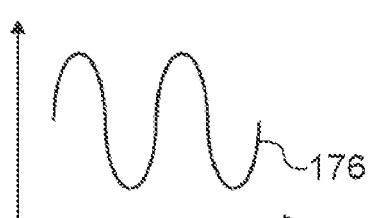
FIGS. 9A, 9B, 9C, 9D, 9E and 9F are diagrams showing signals in components when a reference signal is generated.
Figure 9B:
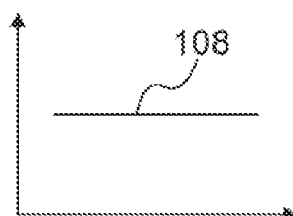
Figure 9C:
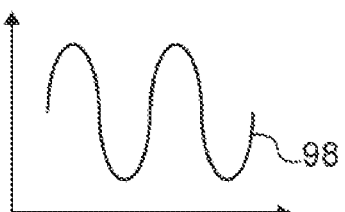

In other words, the output signal 176 of the detection coil 73 is not amplified and then input to the output signal processing circuit 54. The output signal 176, the signal 108, and the signal 98 at that time are shown in FIGS. 9A, 9B, and 9C, respectively. FIGS. 9A, 9B, and 9C show a horizontal axis indicating time (in seconds: s) and a vertical axis indicating voltage (in volts: V). The signal 176 and the signal 98 are sinusoidal waves in this embodiment. From the digital signal that is an output 158 (see FIG. 5) of the analog-to-digital converter circuit 282, the magnitude of the amplitude of the output signal 176 can be directly calculated. In other words, the half of the difference between the maximum value and the minimum value of the output 158 is an amplitude of the output signal 176. In this way, according to this embodiment, the magnitude of the amplitude of the output signal 176 is directly calculated. The magnitude of the amplitude may be acquired by other methods. For example, the output signal 176 is processed by the quadrature-signals detection circuit 86 and the vector operation circuit 89 in the output signal processing circuit 54, and a Z output is acquired. The Z output is an amount proportional to the magnitude of the amplitude of the output signal 176.

The phase is measured in a manner as described below, for example. The output 158 of the analog-to-digital converter circuit 282 and the output 262 from the AC signal source 260 have the same frequency. In this case, from the difference between a time when a maximum value of a digital signal that is the output 158 of the analog-to-digital converter circuit 282 occurs and a time when a maximum value of the output 262 from the AC signal source 260 occurs, the data generator 88 can determine the phase of the output signal 176 with respect to the output 262.

The magnitude of the phase may be acquired by other methods. For example, the entire polishing apparatus may be operating in accordance with one reference clock. In accordance with the reference clock, from the difference between a time when a maximum value of a digital signal occurs and a time when a maximum value of the output 262 from the AC signal source 260 occurs, the data generator 88 can determine the phase of the output signal 176 with respect to the output 262. The data generator 88 holds the acquired time as phase data 160. It should be noted that, when a phase difference does not occur between the output 158 of the analog-to-digital converter circuit 282 and the output 262 from the AC signal source 260 or when the phase difference is too small to be problematic, it is not required to measure the magnitude of the phase.

Figure 8A:
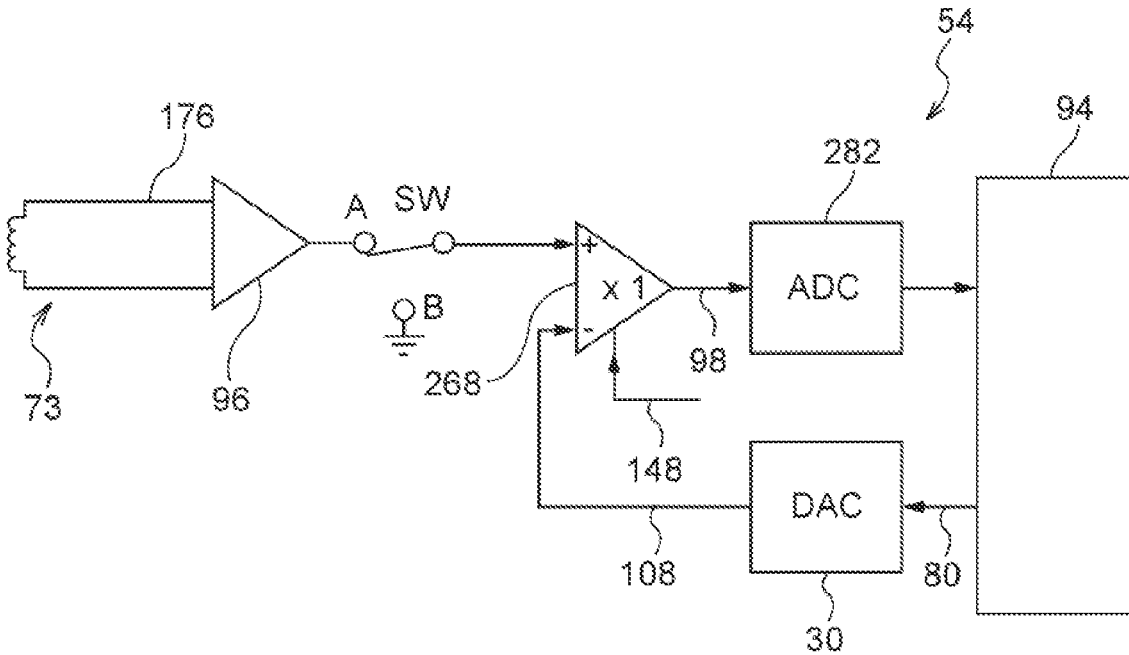
FIGS. 8A and 8B are block diagrams showing a detail configuration of a switch, an amplifier circuit and so on when a reference signal is generated.
Figure 8B:
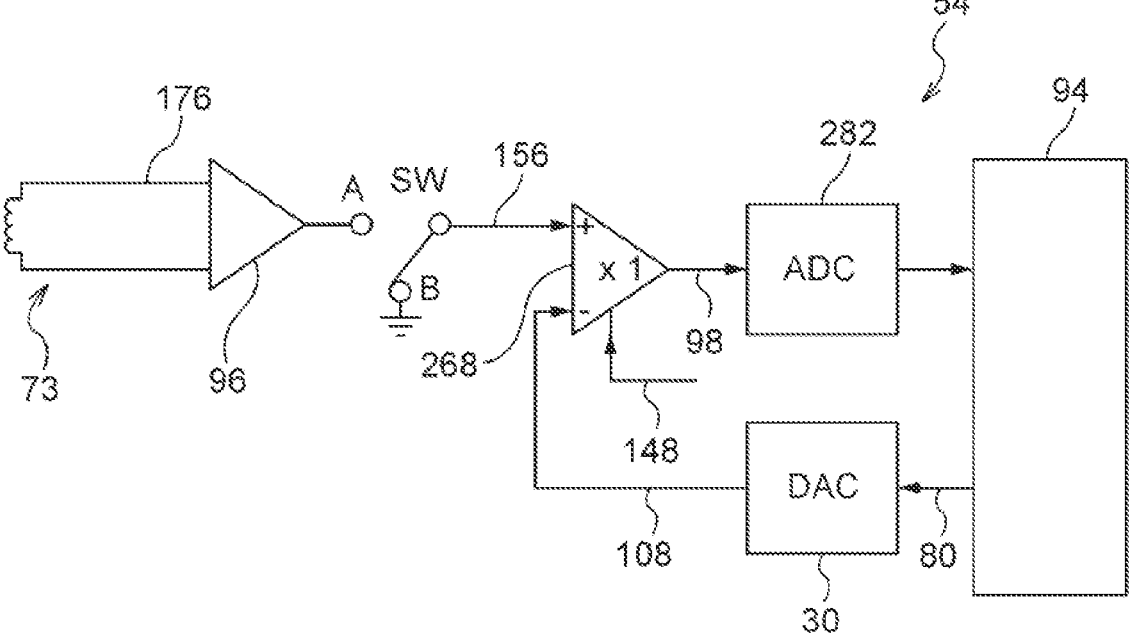

After the data generator 88 holds the amplitude data 150 and the phase data 160, the switch SW is changed from a contact A to a contact B as shown in FIG. 8B. The contact B is grounded, and 0 volt (0 V), for example, is input to the amplifier circuit 268. Then, the data generator outputs the amplitude designation data 152 for designating the first AC generated signal to the AC signal generator. Referring to FIG. 8B, the amplitude and phase of the signal 108 are adjusted.

The amplitude and phase of the signal 108 are adjusted in the first reference state for the following reason: In some cases, a relationship between the amplitude designation data 152 and phase designation data 162 input to the AC signal generator 82 and the output of the AC signal generator 82 may be not clear. For example, the first reference state is a state that the output signal processing circuit 54 is first operated. In this case, the relationship between the amplitude designation data 152 input to the AC signal generator 82 and the output of the AC signal generator 82 may be different from the designed value and may be slightly incorrect. Alternatively, the circuit property of the AC signal generator 82 or the polishing apparatus excluding the AC signal generator 82 may change due to a change of an environment where the AC signal generator 82 is installed or with passage of time. In order to address such situations, an optimum amplitude designation data 152 and phase designation data 162 are acquired by the procedure which is described later. Then, the optimum amplitude designation data 152 and the phase designation data 162 are held in the retainer 66 as the reference data 84.

As an initial value of the amplitude designation data 152, reference data acquired through tests, or an assumed maximum value or minimum value or the like is employed. The data generator 88 outputs the amplitude designation data 152 as an initial value to the AC signal generator 82. The AC signal generator 82 generates a first AC generated signal 80 based on the amplitude designation data 152 and outputs it to the amplifier circuit 268. Since the switch SW is at the contact B and the amplification factor is "1", the amplifier circuit 268 outputs a signal (with an inverted sign) that is in opposite phase of the first AC generated signal 80. It is a signal in opposite phase, but the magnitude of the amplitude does not change. It suffices that the data generator 88 may invert the sign of the output of the amplifier circuit 268 and uses the inverted signal to perform a comparison with the following measurement. The data generator 88 measures the magnitude of the amplitude of the first AC generated signal output from the AC signal generator corresponding to the amplitude designation data 152 as its initial value by one of the already described methods.

The data generator 88 compares the magnitudes of the amplitude data 150 of the output signal 176 that is already held and the amplitude data of the first AC generated signal 80 corresponding to the amplitude designation data 152 as an initial value. Based on a result of the comparison, the data generator 88 generates reference data. If the difference (first amplitude difference) between the two amplitude data pieces is higher than a first amplitude-difference predetermined value or if the first amplitude difference is not at a minimum when compared with the amplitude data, the data generator 88 changes the amplitude designation data such that the first amplitude difference is less than or equal to the first amplitude-difference predetermined value or is at the minimum and outputs the changed amplitude designation data to the AC signal generator 82. This operation is performed until the first amplitude difference is less than or equal to the first amplitude-difference predetermined value or is at the minimum.

Various methods are possible as the method for changing the amplitude designation data 152 by the data generator 88 such that the first amplitude difference is less than or equal to the first amplitude-difference predetermined value or is at a minimum. For example, (1) The amplitude designation data 152 is changed by a predetermined amount of change within a predetermined range in vicinity of the amplitude designation data 152 as an initial value. In this case, the amplitude designation data less than or equal to the first amplitude-difference predetermined value or at the minimum within the predetermined range can be determined as the reference data 154. Alternatively, (2) If the first amplitude difference is reduced as a result of increasing the amplitude designation data 152 as the initial value, the amplitude designation data 152 is further increased. On the other hand, if the first amplitude difference increases, the amplitude designation data 152 is reduced. In this case, the amplitude designation data having the first amplitude difference less than or equal to the first amplitude-difference predetermined value or at the minimum can be determined as the reference data 154.

Figure 9D:
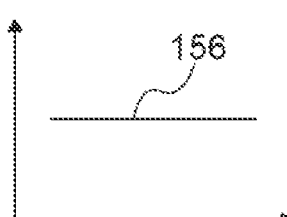
Figure 9E:
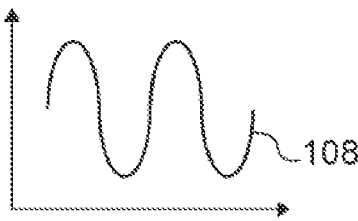
Figure 9F:
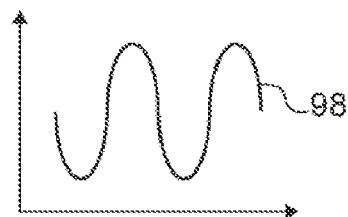

As the reference data 154, the data generator 88 outputs to the retainer 66 the amplitude designation data having the first amplitude difference less than or equal to the first amplitude-difference predetermined value or at the minimum. A signal 156, the signal 108, and the signal 98 input to the + terminal of the amplifier circuit 268 at that time are shown in FIGS. 9D, 9E, and 9F, respectively. FIGS. 9D, 9E, and 9F show a horizontal axis indicating time (in seconds: s) and a vertical axis indicating voltage (in volts: V). The signal 108 and the signal 98 are sinusoidal waves in this embodiment, as already described.

After the adjustment relating to the amplitude, phase adjustment is performed. The switch SW has a state as shown in FIG. 8B. The AC signal generator 82 can generate a plurality of second AC generated signals 80 having different phases. The data generator 88 outputs the phase designation data 162 for designating a second AC generated signal 80 to the AC signal generator 82. The AC signal generator 82 generates and outputs the second AC generated signal 80 based on the phase designation data 162.

As an initial value of the phase designation data 162, reference data acquired through tests, or an assumed maximum value or minimum value or the like is employed. The data generator 88 outputs the phase designation data 162 as an initial value to the AC signal generator 82. The AC signal generator 82 generates a second AC generated signal 80 based on the phase designation data 162 and outputs it to the amplifier circuit 268. Since the switch SW is at the contact B and the amplification factor is "1", the amplifier circuit 268 outputs a signal (with an inverted sign) that is in opposite phase of the first AC generated signal 80. Since it is a signal in opposite phase and the magnitude of the phase is therefore changed by 180 degrees, the data generator 88 may process the signal having a sign inverted from that of the output of the amplifier circuit 268, as already described.

The data generator 88 measures a phase of the second AC generated signal 80 output from the AC signal generator 82 in the manner as already described. The resulting data is compared with phase data 160. Based on a result of the comparison, the data generator 88 generates reference data. When the data generator 88 compares it with the phase data and if the difference from the phase data 160 (phase difference) is higher than a phase-difference predetermined value or if the phase difference is not at a minimum, the data generator 88 changes the phase designation data 162 such that the phase difference is less than or equal to the phase-difference predetermined value or is at the minimum. Various methods are possible as the method for changing the phase designation data 162 by the data generator 88, as already described with respect to the method for changing the amplitude designation data 152.

The changed phase designation data 162 is output to the AC signal generator 82. This is performed until the phase difference is less than or equal to the phase-difference predetermined value or is at the minimum, and the data generator 88 includes, in the reference data 154, the phase designation data 162 when the phase difference is less than or equal to the phase-difference predetermined value or is at the minimum. The reference data 154 including the finally acquired amplitude designation data 152 and phase designation data 162 is sent from the data generator 88 to the retainer 66.

With reference to FIG. 8, the method for acquiring the reference data 154 held in the retainer 66 has been described.

Figure 10:
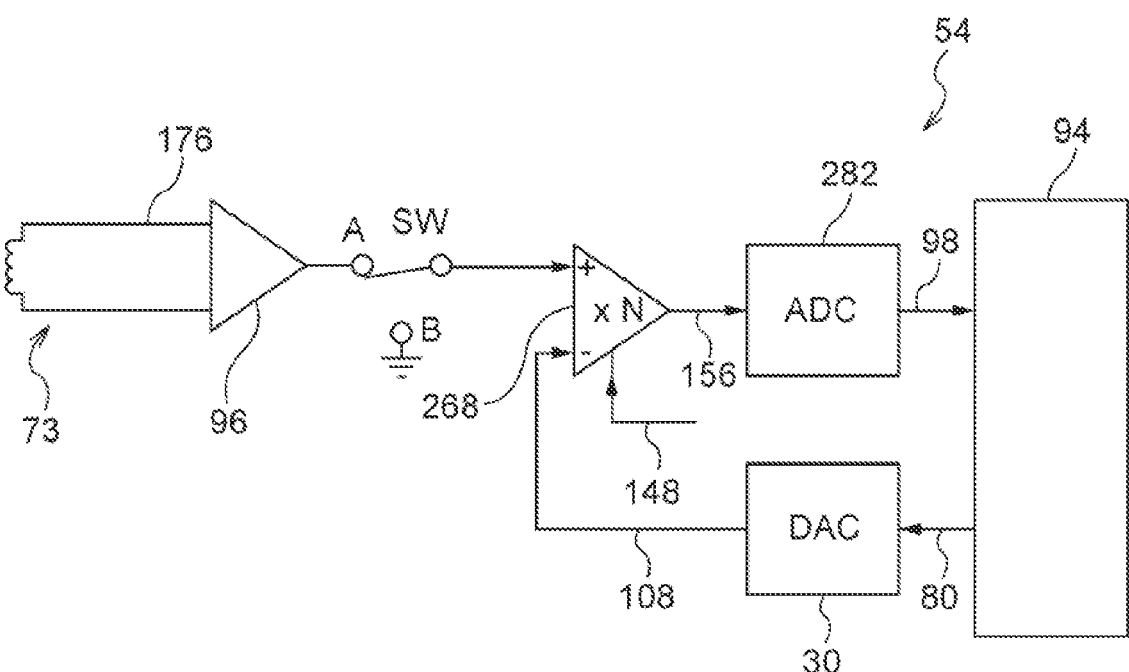
FIG. 10 is a block diagram showing a detail configuration of a switch, an amplifier circuit and so on when a fine adjustment is performed for generating a reference signal.

It may be considered that the reference data 154 can be acquired with sufficiently high precision by the method in FIG. 8. However, if the precision is determined as insufficient and further fine adjustment is to be performed on the acquired reference data 154, the method in FIG. 10 is possible. The method in FIG. 8 and the method in FIG. 10 are different in: (1) Referring to FIG. 8, the amplitude data 150 and phase data 160 held in the data generator 88 and the first and second AC generated signals 80 generated by the AC signal generator 82 are compared. Referring to FIG. 10, the first and second AC generated signals 80 generated from the acquired reference data 154 are compared with the actual output signal 176 in the reference state to increase the precision. (2) While, referring to FIG. 8, the amplification factor of the amplifier circuit 268 is "1", the amplification factor in FIG. 10 is "N". By increasing the amplification factor to extend an error range, the precision is further increased.

In the case in FIG. 10, it is preferable to change the phase first, search the phase designation data 162 for acquiring the smallest phase difference, and then change the amplitude designation data 152 for adjusting the amplitude. The phase is adjusted first because, if the phases are not matched, the amplitude difference increases, and the target value, for example, "0" may not be acquired.

More specifically, the amplifier circuit 268 acquires, in the first reference state, a difference between the amplitude of the output signal 176 (first reference state signal) and the amplitude of the second AC generated signal 80, multiplies the amplitude difference by N, and outputs it as a signal 156 (second amplitude difference). Since the output signal 98 is input to the data generator 88, the data generator 88 can acquire a difference between the signal acquired by multiplying the output signal 176 by more than 1 and a signal acquired by multiplying the second AC generated signal 80 by more than 1.

If the signal 156 acquired by multiplying by N the amplitude difference as a result of the comparison is higher than a second amplitude-difference predetermined value or if the signal 156 is not at the minimum, the data generator 88 changes the phase designation data 162 such that the signal 156 is less than or equal to the second amplitude-difference predetermined value or is at the minimum. Various methods are possible as the method for changing the phase designation data 162 by the data generator 88, as already described with respect to the method for changing the phase designation data 162. The data generator 88 outputs the changed phase designation data 162 to the AC signal generator 82 until the signal 156 is less than or equal to the second amplitude-difference predetermined value or is at the minimum. As the reference data 154, the data generator 88 determines the phase designation data 162 when the signal 156 is less than or equal to the second amplitude-difference predetermined value or is at the minimum.

Next, the amplifier circuit 268 compares, in the first reference state, the magnitude of the amplitude of the first reference state signal and the magnitude of the amplitude of the first AC generated signal 80, multiplies the difference in amplitude as a result of the comparison by N, and outputs it as the signal 156 (second amplitude difference). When the data generator 88 receives input of the output signal 98 and if the signal 156 acquired by multiplying by N the amplitude difference as a result of the comparison is higher than the second amplitude-difference predetermined value or if the signal 156 is not at the minimum, the data generator 88 changes the amplitude designation data 152 such that the signal 156 is less than or equal to the second amplitude-difference predetermined value or is at the minimum. Various methods are possible as the method for changing the amplitude designation data 152 by the data generator 88, as already described with respect to the method for changing the amplitude designation data 152.

Figure 11A:
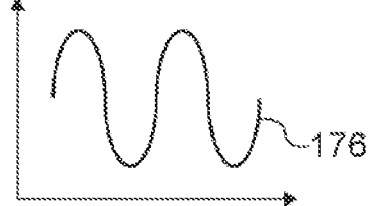
FIGS. 11A, 11B and 11C are diagrams showing signals in components when a fine adjustment is performed.
Figure 11B:
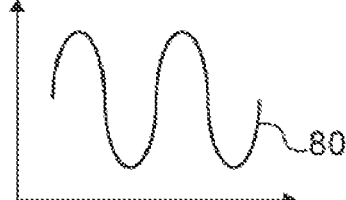
Figure 11C:
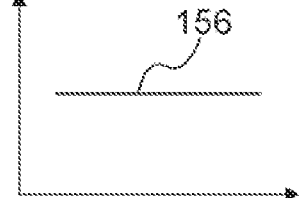

The data generator 88 outputs the changed amplitude designation data 152 to the AC signal generator 82 until the signal 156 is less than or equal to the second amplitude-difference predetermined value or is at the minimum. As the reference data 154, the data generator 88 determines the amplitude designation data 152 when the signal 156 is less than or equal to the second amplitude-difference predetermined value or is at the minimum. The output signal 176 input to the + terminal of the amplifier circuit 268 upon completion of fine adjustment, the first AC generated signal 80 input to the − terminal, and the signal 156 are shown in FIGS. 11A, 11B, and 11C, respectively. FIGS. 11A, 11B, and 11C show a horizontal axis indicating time (in seconds: s) and a vertical axis indicating voltage (in volts: V). The signal 176 and the signal 80 are sinusoidal waves in this embodiment.

Figure 12:
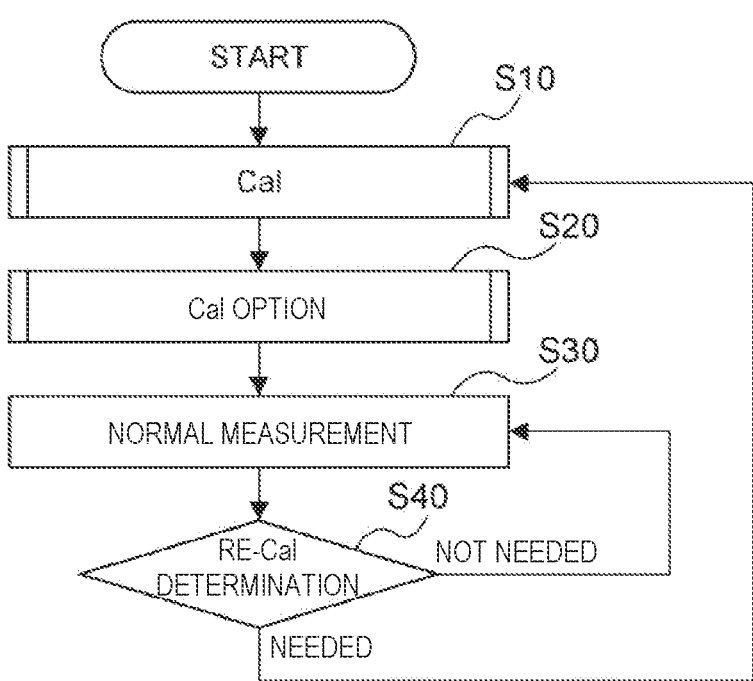
FIG. 12 is a main flowchart for generating a reference signal.
Figure 13:
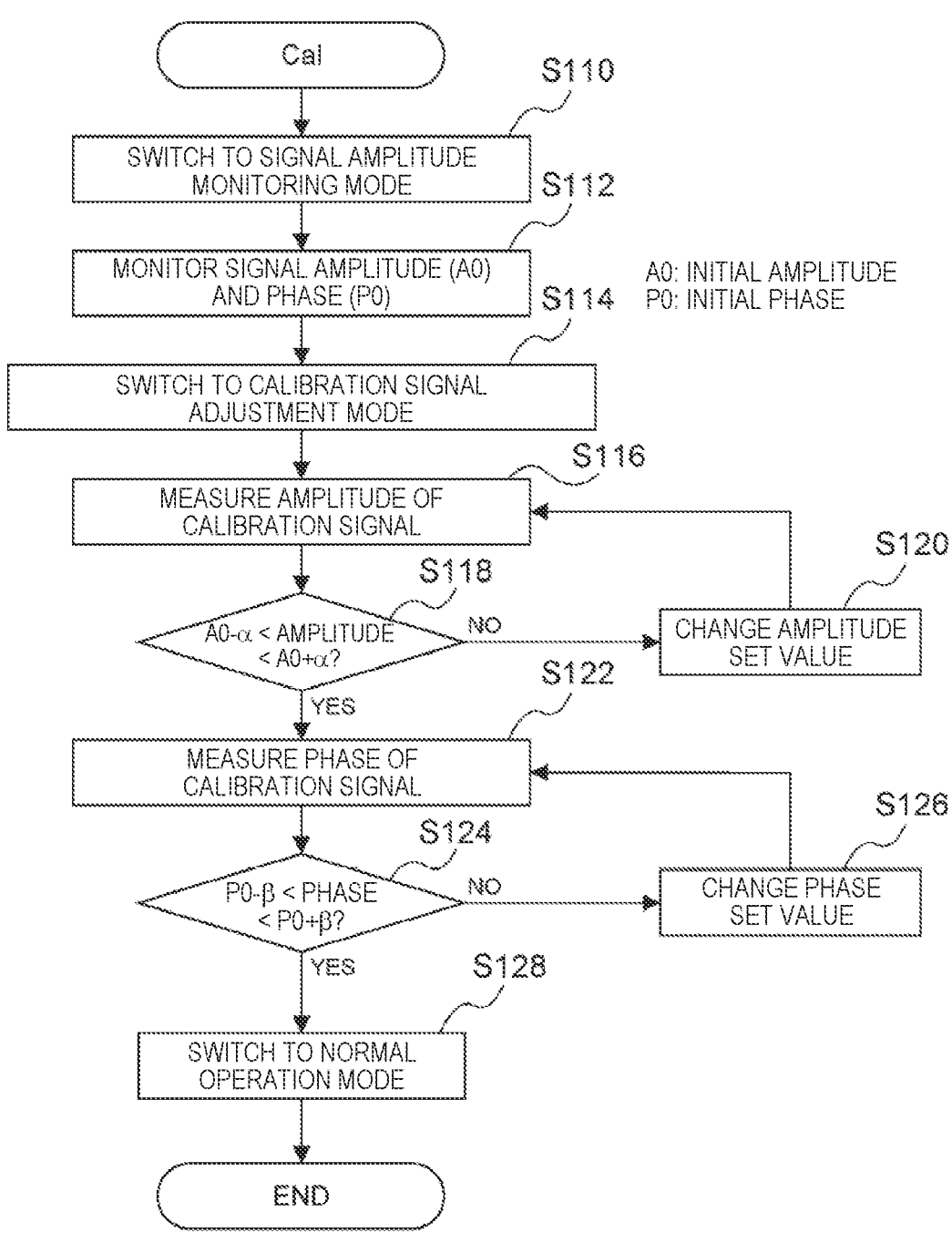
FIG. 13 is a flowchart for generating a reference signal.
Figure 14:
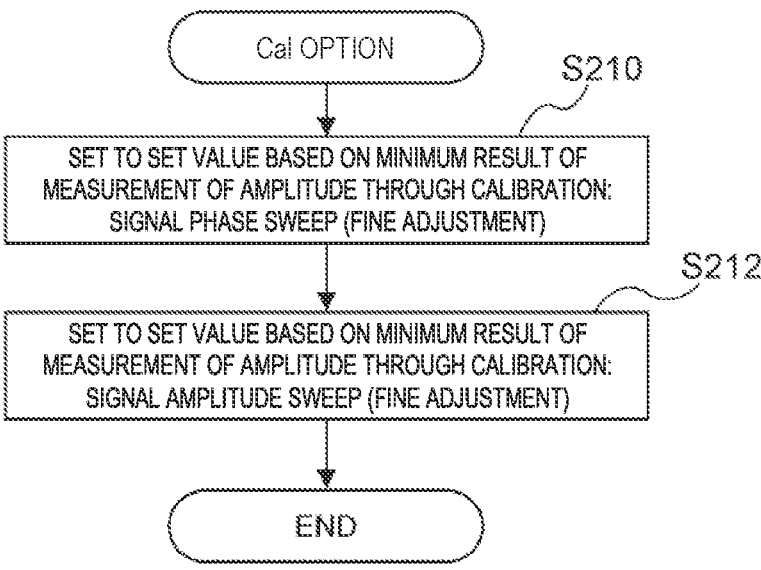
FIG. 14 is a flowchart for performing a fine adjustment.

The processing in FIGS. 8A, 8B and 10 is described with reference to flowcharts in FIGS. 12, 13, and 14. The flowchart in FIG. 12 shows a main flow, and FIGS. 13 and 14 show sub-flowcharts. Referring to FIG. 12, in order to generate a reference signal, step S10 corresponding to the processing shown in FIG. 8 is first performed. Next, as required, step S20 corresponding to the fine adjustment processing shown in FIG. 10 is performed. Then, by using the reference signal, a typical film thickness measurement is performed (step S30). Whether updating the reference signal is needed or not is determined every lapse of predetermined time (S40). If it is determined that the updating is not needed, a typical film thickness measurement is performed (step S30). If it is determined that the updating is needed, a reference signal is generated (S10).

Next, with reference to the flowchart in FIG. 13, the processing (step S10) in FIG. 8 for generating a reference signal is described. First, the end-point detection controller 246 and the output signal processing circuit 54 in a polishing apparatus 164 are switched to a signal amplitude monitoring mode for reference-signal generation (S110). Then, the signal amplitude (A0) and phase (P0) shown in FIG. 8A are monitored (S112). The signal amplitude (A0) is an amplitude of the output signal 176 measured in a reference state, and the phase (P0) is a phase of the output signal 176 measured in the reference state. Next, the end-point detection controller 246 and the output signal processing circuit 54 are switched to a calibration signal adjustment mode in which the processing shown in FIG. 8B is performed (S114) in order to adjust the amplitudes and phases of the first and second AC generated signals 80 generated by the AC signal generator 82.

In the adjustment mode, for adjustment of the amplitude of the first AC generated signal 80, the amplitude of the first AC generated signal 80 is measured (S116) as calibration signal amplitude measurement. Whether the measured amplitude of the first AC generated signal 80 falls within a predetermined value range, that is, "A0−α<amplitude of first AC generated signal 80<A0+α" is satisfied or not is determined (S118). Here, A0−α indicates a lower limit of the predetermined value range, and A0+α indicates an upper limit of the predetermined value range. α indicates the magnitude of the half of the width of the predetermined value. If the measured amplitude of the first AC generated signal 80 does not fall within the predetermined value range (NO), the amplitude designation data 152 is changed to change the amplitude set value (S120). Then, the processing returns to S116. If the amplitude falls within the predetermined value range (YES), the adjustment of the amplitude of the first AC generated signal 80 ends.

Next, the phase of the second AC generated signal 80 is measured (S122) as calibration signal phase measurement. Whether the measured phase of the second AC generated signal 80 falls within a predetermined value range, that is, "P0−β<phase of second AC generated signal 80<P0+β" is satisfied or not is determined (S124). Here, P0−β indicates a lower limit of the predetermined value range, and P0+β indicates an upper limit of the predetermined value range. 13 indicates the magnitude of the half of the width of the predetermined value. If the measured phase of the second AC generated signal 80 does not fall within the predetermined value range (NO), the phase designation data 162 is changed to change the phase set value (S126). Then, the processing returns to S122. If the phase falls within the predetermined value range (YES), the adjustment of the phase of the first AC generated signal 80 ends. The end-point detection controller 246 and the output signal processing circuit 54 are switched to a normal operation mode for performing film thickness measurement (S128).

Next, with reference to the flowchart in FIG. 14, the processing in FIG. 10 (step S20 in FIG. 12) for generating a reference signal is described. First of all, fine adjustment is performed by sweeping the phase of the second AC generated signal 80 within a predetermined range. The phase having a minimum difference between the amplitude and the set value as a result of the measurement of the amplitude of the second AC generated signal 80 through the fine adjustment is set as the phase set value (S210). Next, fine adjustment is performed by sweeping the amplitude of the second AC generated signal 80 within a predetermined range. The amplitude having a minimum difference between the amplitude and the set value as a result of the measurement of the amplitude of the second AC generated signal 80 through the fine adjustment is set as the amplitude set value (S212).

Figure 15A:
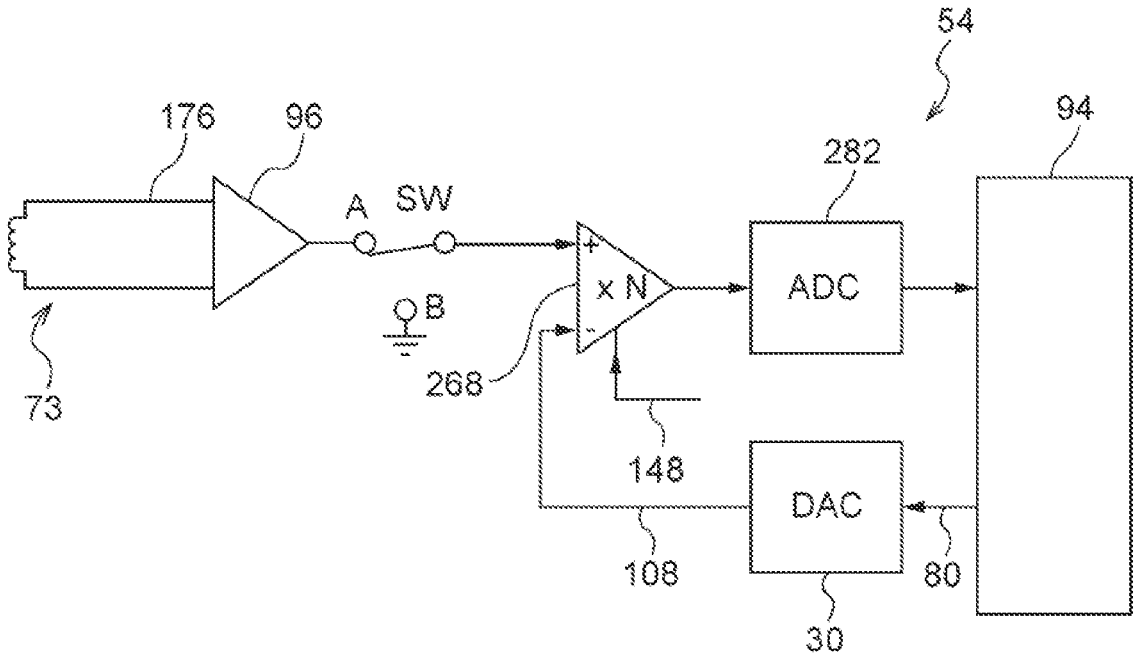
FIGS. 15A and 15B are block diagrams showing a detail configuration of a switch, an amplifier circuit and so on when a calibration is performed again.
Figure 15B:
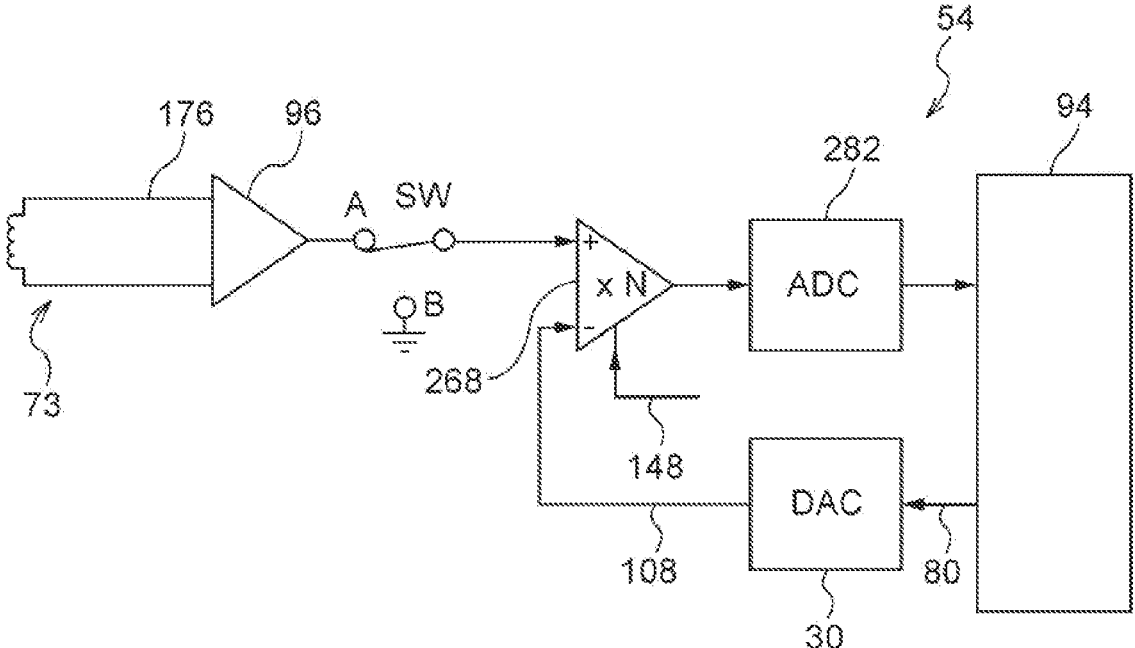

Next, with reference to FIG. 15, there is described performing calibration again when the difference between the reference signal and the sensor output in the reference state is higher than the predetermined value after a lapse of time. FIG. 15A shows a result of measurement of the output signal 176 in the reference state immediately after fine adjustment. FIG. 15A is the same as FIG. 10. FIG. 15B shows a result of measurement of the output signal 176 when the difference between the reference signal and the sensor output in the reference state is higher than the predetermined value after a lapse of time. The AC generated signal 80 in FIG. 15 is a reference signal after adjustment of the amplitude and phase is completed as described with reference to FIG. 8 or 10.

Figure 16A:
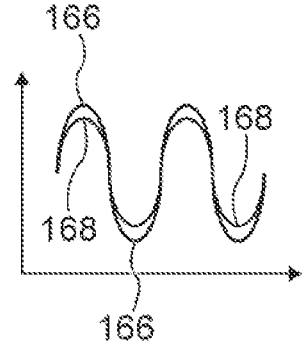
FIGS. 16A, 16B and 16C are diagrams showing signals in components when a calibration is performed again.
Figure 16B:
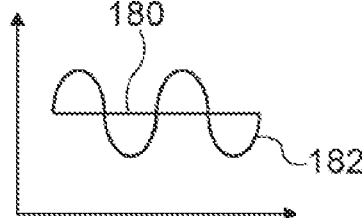
Figure 16C:
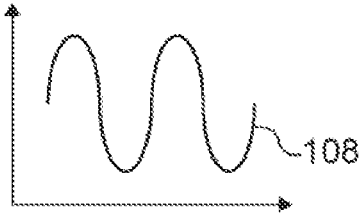

FIG. 16 shows results of measurement of the output signal 176 in the reference state immediately after fine adjustment and after a lapse of a certain period of time. Referring to FIG. 16A, a signal 166 is the output signal 176 of the detection coil 73 immediately after fine adjustment, and a signal 168 is the output signal 176 in the reference state after a lapse of a certain period of time. Comparing the signal 166 and the signal 168, the amplitude is changed. Referring to FIG. 16B, a signal 180 is the output of the amplifier circuit 268 immediately after fine adjustment, and a signal 182 is the output of the amplifier circuit 268 in the reference state after a lapse of a certain period of time. Comparing the signal 180 and the signal 182, the signal 180 has an amplitude that is "0" and is constant while the signal 182 has an amplitude that is not "0" and is changed. FIG. 16C shows a signal 108. FIGS. 16A, 16B, and 16C show a horizontal axis indicating time (in seconds: s) and a vertical axis indicating voltage (in volts: V). The signals 166, 168, 182, and 108 are sinusoidal waves in this embodiment.

The adjustment for the amplitude and the phase in FIG. 15B is performed in the same manner as that of the fine adjustment shown in FIG. 10. In other words, amplitude adjustment is performed after phase adjustment. More specifically, in a second reference state after a first reference state, the AC signal generator 82 generates a second AC generated signal 80 having an amplitude and a phase corresponding to the first reference state signal based on the reference data 154 and outputs it as a reference signal. In the second reference state, the detection coil 73 outputs a second reference state signal that is the output signal 176. In the second reference state, the difference circuitry 268 receives input of the output signal 176 and the second AC generated signal 80 output from the AC signal generator 82 and acquires a reference difference between the amplitude of the output signal 176 and the amplitude of the second AC generated signal 80.

If the reference difference is higher than a reference-difference predetermined value, (1) the output signal processing circuit 54 outputs an alarm signal, and/or (2) the data generator 88 measures the magnitude of the amplitude of the second AC generated signal 80 output from the detection coil 73 in the second reference state and updates and holds the phase of the reference data 154 based on the measured amplitude of the second AC generated signal 80. After the phase adjustment, the first AC generated signal 80 having a different amplitude is compared with the output signal 176, and adjustment of the amplitude is performed.

The adjustment for the amplitude and the phase in FIG. 15B is performed in the same manner as that of the fine adjustment shown in FIG. 10. However, the adjustment for the amplitude and the phase in FIG. 15B may be performed in a different manner from the fine adjustment shown in FIG. 10. For example, the adjustment method shown in FIG. 8 may be performed. The processing shown in FIG. 15B may be performed at all times. For example, the processing can be performed every one rotation of the polishing table 100.

Figure 17A:
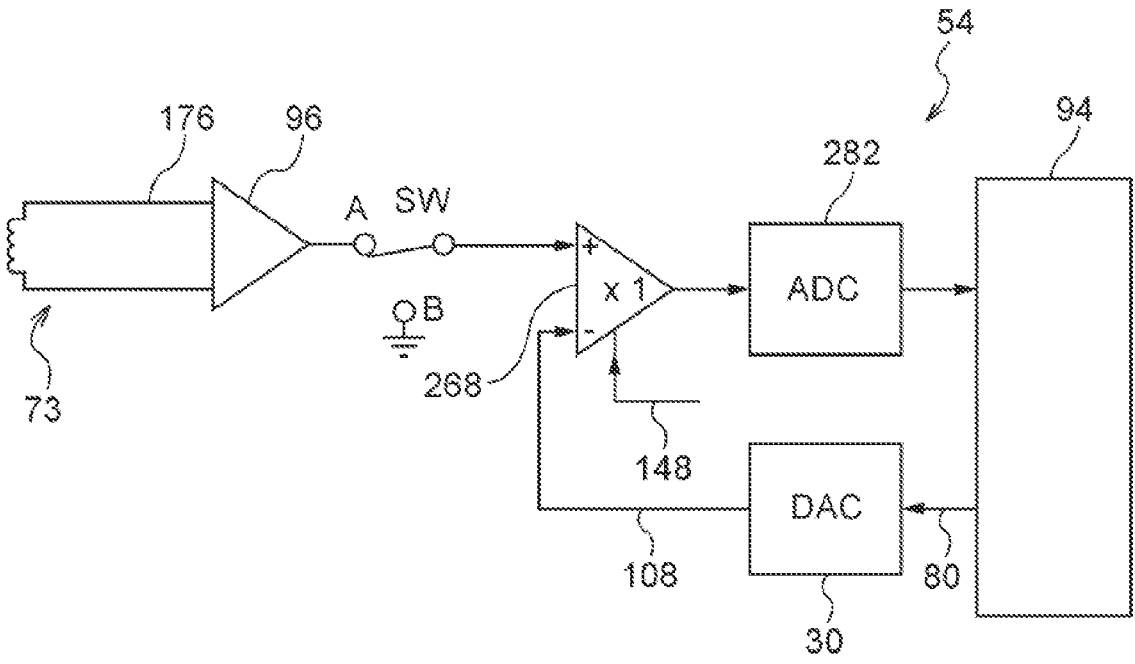
FIGS. 17A and 17B are block diagrams showing a detail configuration of a switch, an amplifier circuit and so on when the amplification factor is varied in accordance with the types and polishing states of a semiconductor wafer and conductor.

Next, changing the amplification factor of the amplifier circuit 268 in accordance with the types and polishing states of a semiconductor wafer WH and conductor mf is described. The reason why the amplification factor is changed is for securing a dynamic range of the processing circuit such as the amplifier circuit 268. In other words, it is a countermeasure that prevents an output from the amplifier circuit 268 and so on from being saturated. More specifically, the output signal processing circuit 54 has a low-gain mode in which the amplification factor for measuring a film thickness is low. For example, the amplifier circuit 268 that is an amplifier has a variable amplification factor for amplifying the film thickness amplitude in accordance with the film thickness of the conductor mf. When the film thickness is thick, the amplification factor is 1× as shown in FIG. 17A. When the film thickness is thin, the amplification factor is NX. In this way, with the amplification factor that is varied in times, the output signal 176, that is, the film thickness is measured. When the film thickness is thick, the amplitude of the difference (changed portion) between the output of the detection coil in the reference state and the output of the detection coil in the film thickness measurement mode can be large as shown in FIGS. 18A and 18D, and the amplification factor can be lower than NX, such as 1×, for example.

Figure 18A:
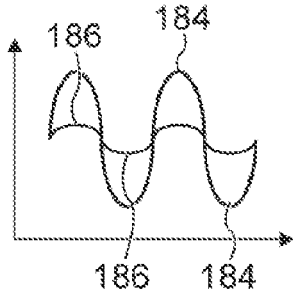
FIGS. 18A, 18B, 18C, 18D, 18E, and 18F are diagrams showing signals in components when the amplification factor is varied in accordance with the types and polishing states of a semiconductor wafer and conductor.
Figure 18B:
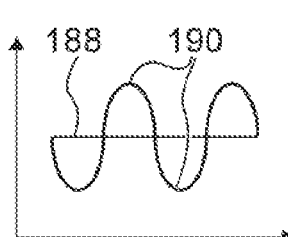
Figure 18C:
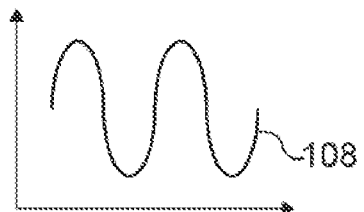
Figure 18D:
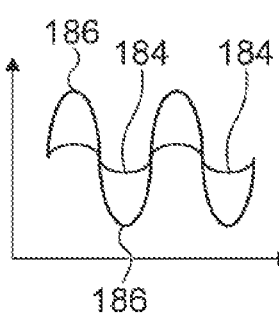

FIGS. 18A, 18B, and 18C show the signal in each of the components in FIG. 17A. When the film thickness is thick, a result of measurement of the output signal 176 in the reference state or when the film thickness is thin is shown. Referring to FIG. 18A, a signal 184 is the output signal 176 of the detection coil 73 in the reference state or when the film thickness is thin, and a signal 186 is the output signal 176 when the film thickness is thick. Comparing the signal 184 and the signal 186, the amplitude is small when the film thickness is thick. Referring to FIG. 18B, a signal 188 is the output of the amplifier circuit 268 in the reference state or when the film thickness is thin, and a signal 190 is the output of the amplifier circuit 268 when the film thickness is thick.

Comparing the signal 188 and the signal 190, the signal 188 has an amplitude that is substantially "0" and is constant while the signal 190 has an amplitude that is larger than "0" and is changing. From FIG. 18B, it is proper that the amplification factor is 1× or in vicinity thereof, and, when the amplification factor is NX as shown in FIG. 6, it can be seen that no dynamic range can be secured for the film thickness. FIG. 18C shows a signal 108 that is a reference signal. FIGS. 18A, 18B, and 18C show a horizontal axis indicating time (in seconds: s) and a vertical axis indicating voltage (in volts: V). The signals 184, 186, 190, and 108 are sinusoidal waves in this embodiment.

Figure 17B:
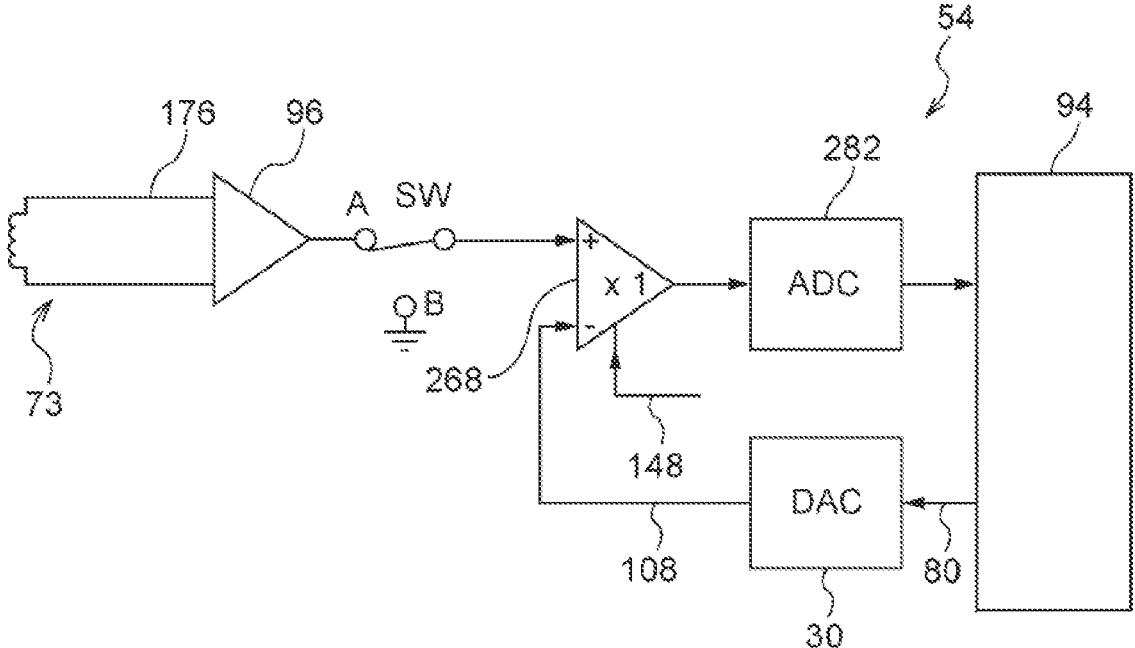

Another method for securing a dynamic range is shown in FIG. 17B. In FIG. 17B, the amplification factor is 1×, and, unlike FIG. 17A, the AC signal generator 82 outputs a signal 108 having a constant value (such as "0 volt", for example). When the film thickness is thick, the amplification factor is 1×. In other words, for measuring the film thickness of the conductor mf, when the film thickness of the conductor mf is larger than a film-thickness predetermined value, the AC signal generator 82 generates a DC signal and outputs it as a reference signal 108. The difference circuitry 268 receives input of an output signal 176 that is a film thickness signal output from the detection coil 73 and a DC signal output from the AC signal generator 82, acquires a difference between the amplitude of the film thickness signal and the amplitude of the DC signal, and determines it as a film thickness amplitude.

Figure 18E:
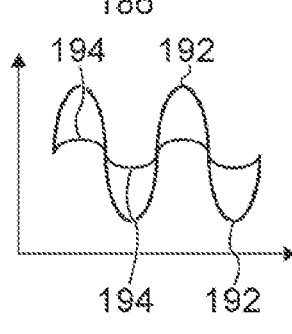
Figure 18F:
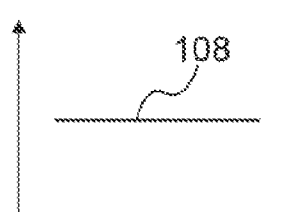

FIGS. 18D, 18E, and 18F show the signal in each of the components in FIG. 17B. Results of measurement of the output signal 176 are shown as to when the film thickness is thick, and in the reference state or when the film thickness is thin. FIG. 18D is the same as FIG. 18A. In other words, a signal 184 is the output signal 176 of the detection coil 73 in the reference state or when the film thickness is thin, and a signal 186 is the output signal 176 when the film thickness is thick. Referring to FIG. 18E, a signal 192 is the output of the amplifier circuit 268 in the reference state or when the film thickness is thin, and a signal 194 is the output of the amplifier circuit 268 when the film thickness is thick.

Comparing the signal 192 and the signal 194, the signal 194 has an amplitude close to "0" and is slightly oscillating while the signal 192 has an amplitude that is significantly larger than "0" and is changing. From FIG. 18E, it is proper that the amplification factor is 1× or in vicinity thereof and the signal 108 is constant, and, when the amplification factor is NX as shown in FIG. 6, it can be seen that no dynamic range can be secured for the film thickness. FIG. 18C shows a signal 108 that is a reference signal. FIGS. 18A, 18B, and 18C show a horizontal axis indicating time (in seconds: s) and a vertical axis indicating voltage (in volts: V). The signals 192 and 194 are sinusoidal waves in this embodiment.

Next, an example of a time required for a calibration for acquiring the reference signal in FIG. 8B is described. Assuming that DDS method is used for the AC signal generator 82, time takes most when the amplitude and the phase are changed in the amplitude range and all of the range of phase precision that the AC signal generator 82 can generate. Performing calibration on the entire ranges by binary search, when, for example, adjustment is possible in ranges of 12 bits for amplitude and 14 bits for phase, the search ends in the entire range through 26 measurements.

This is because, in order to search 12 bits by binary search, an amplitude within a predetermined value range can be found across the entire range of amplitude of the output signal 176 by 12 searches. It is further because, in order to search 14 bits by binary search, a phase within a predetermined value range can be found across the entire range of phase of the output signal 176 by 14 searches. When one measurement takes 1 msec, 26 measurements are completed in 26 msec. According to a method using a bridge circuit as in the past, adjusting a resistance value within the bridge circuit is required. In this case, turning a motor is required for adjusting a variable resistance within the bridge circuit. According to this embodiment, since motor turning is not required, high-speed operations are possible.

Therefore, performing calibration in real time (that is, for one turn of the table) is sufficiently possible. However, when the reference data 154 changes while one semiconductor wafer WH is being polished, an error may possibly occur. Therefore, in some cases, performing the calibration processing before polishing is preferable. As already described, an alarm may be expired only when the output signal 176 in the reference state is out of a predetermined value.

Referring back to FIGS. 1 and 2, disposition of the output signal processing circuit 54 is described. The output signal processing circuit 54 can be disposed at the position shown in FIG. 1. As shown in FIG. 2, the polishing table 100 in the polishing apparatus can turn around its shaft center 170 as indicated by the arrow. Within the polishing table 100, the AC signal source 260 and the output signal processing circuit 54 are buried.

The eddy-current sensor 50 and the output signal processing circuit 54 may be integrated. An output signal 172 of the output signal processing circuit 54 passes through within a table axis 170 of the polishing table 100, and the output signal processing circuit 54 is connected to the end-point detection controller 246 by the output signal 172 through a rotary joint (not shown) provided at an axial end of the table axis 170. It should be noted that the output signal processing circuit 54 may be disposed externally to the polishing table 100.

The polishing apparatus 164 has the output signal processing circuit 54 of the eddy-current sensor 50 as already described and polishes a conductor. The polishing apparatus 164 has a polisher 196 having the polishing table 100 that can polish a conductor and a top ring that holds a semiconductor wafer WH and presses it against a polishing surface on the polishing table 100. In order to measure a film thickness of a conductor, the polishing apparatus 164 further has the eddy-current sensor 50 capable of forming eddy current in the conductor and detect the formed eddy current and the end-point detection controller 246 that acquires a film thickness based on a film thickness amplitude output from the difference circuitry 268.

The end-point detection controller 246 performs film thickness computing for acquiring a film thickness from the magnitude of an impedance Z or a phase output or the like. The end-point detection controller 246 is a film-thickness calculator that acquires a film thickness from the signal 172 output from the output signal processing circuit 54. The end-point detection controller 246 calculates a film thickness from X, Y, Z outputs and a θ output. Various calculation methods are available. For example, a relationship between Z output and film thickness may be acquired in advance, and a film thickness is acquired from a Z output.

Next, an output signal processing method for an eddy-current sensor is described in which processes an output signal of the detection coil 73, which is output from the eddy-current sensor 50 having the exciting coil 72 capable of forming eddy current in a conductor mf and the detection coil 73 that detects eddy current that can be formed in the conductor mf. In this method, the AC signal generator 82 generates a plurality of first AC generated signals 80 having different amplitudes. The retainer 66 holds reference data 154 for identifying a first AC generated signal 80 corresponding to an output signal 176 that is a first reference state signal output from the detection coil 73 in a reference state among the plurality of first AC generated signals 80.

In order to measure a film thickness of a conductor mf, the AC signal generator 82 generates a first AC generated signal 80 corresponding to a first reference state signal based on the reference data 154 and outputs it as a reference signal. For measuring a film thickness of a conductor mf, the difference circuitry 268 receives input of an output signal 176 that is a film thickness signal output from the detection coil 73 and a reference signal 108 output from the AC signal generator 82 and acquires a difference between the amplitude of the film thickness signal and the amplitude of the reference signal. The data generator 88 measures an amplitude of a first reference state signal in the first reference state and generates the reference data 154.

Having described exemplary embodiments of the present invention, the aforementioned embodiments of the present invention are for easy understanding of the present invention and is not intended to limit the present invention. The present invention may be modified and improved without departing from its spirit, and equivalents thereof are certainly embraced in the present invention. Also, in the scope where at least a part of the aforementioned problem can be solved or in the scope where at least a part of effects thereof can be accomplished, an arbitrary combination or omission of components described in the claims and herein is possible.

This application claims priority under the Paris Convention to Japanese Patent Application No. 2022-162333 filed on Nov. 8, 2018. The entire disclosure of Japanese Patent Laid-Open No. 2005-121616 including specification, claims, drawings and summary is incorporated herein by reference in its entirety.

What is claimed is:

1. An output signal processing device for an eddy-current sensor having an exciting coil capable of forming eddy current in a conductor and a detection coil that detects the eddy current that can be formed in the conductor, the output signal processing device processing an output signal of the detection coil to be output by the eddy-current sensor, wherein the output signal processing device has an AC signal generator capable of generating a plurality of first AC generated signals having different amplitudes; and a retainer that holds reference data for identifying the first AC generated signal corresponding to the output signal that is a first reference state signal output from the detection coil in a first reference state, among the plurality of first AC generated signals, wherein, when a film thickness of the conductor is to be measured, the AC signal generator generates the first AC generated signal based on the reference data and outputs the first AC generated signal as a reference signal, wherein the output signal processing device further has a difference circuitry that, when a film thickness of the conductor is to be measured, receives input of the output signal that is a film thickness signal output from the detection coil and the reference signal output from the AC signal generator and acquires and outputs a film thickness amplitude that is a difference between the amplitude of the film thickness signal and the amplitude of the reference signal; and a data generator that, in the first reference state, measures an amplitude of the first reference state signal and generates the reference data, wherein the data generator in the first reference state measures a magnitude of an amplitude of the first reference state signal and holds amplitude data regarding the magnitude of the amplitude, wherein the data generator outputs amplitude designation data for designating the first AC generated signal to the AC signal generator, wherein the AC signal generator generates and outputs the first AC generated signal based on the amplitude designation data, and wherein the data generator measures a magnitude of an amplitude of the first AC generated signal output from the AC signal generator, compares the amplitude of the first AC generated signal with the amplitude data, and generates the reference data based on a result of the comparison, wherein the data generator, in the first reference state, measures a phase of the first reference state signal and holds phase data regarding the phase, the AC signal generator can generate a plurality of second AC generated signals having different phases, the data generator outputs phase designation data for designating the second AC generated signal to the AC signal generator, the AC signal generator generates and outputs the second AC generated signal based on the phase designation data, and the data generator measures a phase of the second AC generated signal output from the AC signal generator, compares the phase of the second AC generated signal with the phase data, and generates the reference data based on a result of the comparison.

2. The output signal processing device for the eddy-current sensor according to claim 1, wherein if a first amplitude difference from the amplitude data is higher than a first amplitude-difference predetermined value or if the first amplitude difference is not at a minimum when compared with the amplitude data, the data generator changes the amplitude designation data such that the first amplitude difference is less than or equal to the first amplitude-difference predetermined value or is at the minimum and outputs the changed amplitude designation data to the AC signal generator until the first amplitude difference is less than or equal to the first amplitude-difference predetermined value or is at the minimum, and wherein as the reference data, the data generator determines the amplitude designation data when the first amplitude difference is less than or equal to the first amplitude-difference predetermined value or is at the minimum.

3. The output signal processing device for the eddy-current sensor according to claim 1 wherein if a phase difference from the phase data is higher than a phase-difference predetermined value or if the phase difference is not at a minimum when compared with the phase data, the data generator changes the phase designation data such that the phase difference is less than or equal to the phase-difference predetermined value or is at the minimum and outputs the changed phase designation data to the AC signal generator until the phase difference is less than or equal to the phase-difference predetermined value or is at the minimum, and wherein the data generator includes, in the reference data, the phase designation data when the phase difference is less than or equal to the phase-difference predetermined value or is at the minimum.

4. The output signal processing device for the eddy-current sensor according to claim 1, wherein (1) the data generator in the first reference state is configured to compare a magnitude of an amplitude of the first reference state signal and a magnitude of an amplitude of the first AC generated signal;

if a second amplitude difference acquired by multiplying a difference between the compared amplitudes by more than 1 is higher than a second amplitude-difference predetermined value or if the second amplitude difference is not at a minimum, the data generator changes the amplitude designation data such that the second amplitude difference is less than or equal to the second amplitude-difference predetermined value or is at the minimum and outputs the changed amplitude designation data to the AC signal generator until the second amplitude difference is less than or equal to the second amplitude-difference predetermined value or is at the minimum, and as the reference data, the data generator determines the amplitude designation data when the second amplitude difference is less than or equal to the second amplitude-difference predetermined value or is at the minimum, or wherein (2) the data generator in the first reference state is configured to compare an amplitude of the first reference state signal and an amplitude of the second AC generated signal;

if the second amplitude difference acquired by multiplying a difference between the compared amplitudes by more than 1 is higher than the second amplitude-difference predetermined value or if the second amplitude difference is not at a minimum, the data generator changes the phase designation data such that the second amplitude difference is less than or equal to the second amplitude-difference predetermined value or is at the minimum and outputs the changed phase designation data to the AC signal generator until the second amplitude difference is less than or equal to the second amplitude-difference predetermined value or is at the minimum, and as the reference data, the data generator determines the phase designation data when the second amplitude difference is less than or equal to the second amplitude-difference predetermined value or is at the minimum.

5. The output signal processing device for the eddy-current sensor according to claim 1, wherein the output signal processing device has an amplifier that amplifies the film thickness amplitude.

6. The output signal processing device for the eddy-current sensor according to claim 5, wherein the amplifier has an amplification factor for amplifying the film thickness amplitude that is variable in accordance with a film thickness of the conductor.

7. The output signal processing device for the eddy-current sensor according to claim 1, wherein, when a film thickness of the conductor is measured, when the film thickness of the conductor is larger than a film-thickness predetermined value, the AC signal generator generates a DC signal and outputs the DC signal as the reference signal, and wherein the difference circuitry receives input of the film thickness signal output from the detection coil and the DC signal output from the AC signal generator, acquires a difference between an amplitude of the film thickness signal and an amplitude of the DC signal, and determines the difference as the film thickness amplitude.

8. A polishing apparatus having an output signal processing device for an eddy-current sensor according to claim 1, wherein the polishing apparatus polishes the conductor, the polishing apparatus comprising:

a polisher configured to polish the conductor;

the eddy-current sensor configured to form the eddy current in the conductor and detect the formed eddy current for measuring a film thickness of the conductor; and a film-thickness calculator configured to acquire the film thickness from the film thickness amplitude output from the difference circuitry.

9. The output signal processing device for the eddy-current sensor according to claim 1, wherein (1) the data generator in the first reference state is configured to compare a magnitude of an amplitude of the first reference state signal and a magnitude of an amplitude of the first AC generated signal;

if a second amplitude difference acquired by multiplying a difference between the compared amplitudes by more than 1 is higher than a second amplitude-difference predetermined value or if the second amplitude difference is not at a minimum, the data generator changes the amplitude designation data such that the second amplitude difference is less than or equal to the second amplitude-difference predetermined value or is at the minimum and outputs the changed amplitude designation data to the AC signal generator until the second amplitude difference is less than or equal to the second amplitude-difference predetermined value or is at the minimum, and as the reference data, the data generator determines the amplitude designation data when the second amplitude difference is less than or equal to the second amplitude-difference predetermined value or is at the minimum, and wherein (2) the data generator in the first reference state is configured to compare an amplitude of the first reference state signal and an amplitude of the second AC generated signal;

if the second amplitude difference acquired by multiplying a difference between the compared amplitudes by more than 1 is higher than the second amplitude-difference predetermined value or if the second amplitude difference is not at a minimum, the data generator changes the phase designation data such that the second amplitude difference is less than or equal to the second amplitude-difference predetermined value or is at the minimum and outputs the changed phase designation data to the AC signal generator until the second amplitude difference is less than or equal to the second amplitude-difference predetermined value or is at the minimum, and as the reference data, the data generator determines the phase designation data when the second amplitude difference is less than or equal to the second amplitude-difference predetermined value or is at the minimum.

10. An output signal processing device for an eddy-current sensor having an exciting coil capable of forming eddy current in a conductor and a detection coil that detects the eddy current that can be formed in the conductor, the output signal processing device processing an output signal of the detection coil to be output by the eddy-current sensor, wherein the output signal processing device has an AC signal generator capable of generating a plurality of first AC generated signals having different amplitudes; and a retainer that holds reference data for identifying the first AC generated signal corresponding to the output signal that is a first reference state signal output from the detection coil in a first reference state, among the plurality of first AC generated signals, wherein, when a film thickness of the conductor is to be measured, the AC signal generator generates the first AC generated signal based on the reference data and outputs the first AC generated signal as a reference signal, wherein the output signal processing device further has a difference circuitry that, when a film thickness of the conductor is to be measured, receives input of the output signal that is a film thickness signal output from the detection coil and the reference signal output from the AC signal generator and acquires and outputs a film thickness amplitude that is a difference between the amplitude of the film thickness signal and the amplitude of the reference signal; and a data generator that, in the first reference state, measures an amplitude of the first reference state signal and generates the reference data, wherein in a second reference state after the first reference state, the AC signal generator generates the first AC generated signal corresponding to the first reference state signal based on the reference data and outputs the first AC generated signal as the reference signal, wherein, in the second reference state, the detection coil outputs a second reference state signal that is the output signal, wherein, in the second reference state, the difference circuitry receives input of the second reference state signal and the reference signal output from the AC signal generator and acquires a reference difference between an amplitude of the second reference state signal and an amplitude of the reference signal, wherein if the reference difference is higher than a reference-difference predetermined value, the output signal processing device is configured to: (1) output an alarm signal, or (2) measure by the data generator a magnitude of an amplitude of the second reference state signal output from the detection coil in the second reference state and update and hold the reference data based on the measured amplitude of the second reference state signal, or is configured to both output the alarm signal and measure by the data generator a magnitude of an amplitude of the second reference state signal output from the detection coil in the second reference state and update and hold the reference data based on the measured amplitude of the second reference state signal.

* * * * *